(12) United States Patent
Lee et al.

(10) Patent No.: US 12,360,553 B2
(45) Date of Patent: Jul. 15, 2025

(54) ELECTRONIC APPARATUS AND METHOD OF CONTROLLING THE SAME

(71) Applicant: SAMSUNG ELECTRONICS CO., LTD., Suwon-si (KR)

(72) Inventors: Kangchun Lee, Suwon-si (KR); Sungsik Park, Suwon-si (KR); Yongman Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/213,326

(22) Filed: Jun. 23, 2023

(65) Prior Publication Data

US 2023/0333591 A1    Oct. 19, 2023

Related U.S. Application Data

(63) Continuation of application No. 17/103,064, filed on Nov. 24, 2020, now Pat. No. 11,709,526.

(30) Foreign Application Priority Data

Dec. 10, 2019  (KR) .................... 10-2019-0163930

(51) Int. Cl.
*G06F 1/16* (2006.01)
*G06F 3/147* (2006.01)
(Continued)

(52) U.S. Cl.
CPC ............ *G06F 1/1622* (2013.01); *G06F 3/147* (2013.01); *G06F 16/33* (2019.01); *G06F 16/583* (2019.01); *G09G 3/20* (2013.01); *G09G 5/391* (2013.01); *G06F 2200/1614* (2013.01); *G09G 2340/0492* (2013.01)

(58) Field of Classification Search
CPC ........ G06F 3/147; G06F 16/33; G06F 16/583; G06F 2200/1614; G09G 3/20; G09G 5/391; G09G 2340/0492
See application file for complete search history.

(56) References Cited

U.S. PATENT DOCUMENTS 10,402,068 B1   9/2019  Dodge
2004/0257385 A1  12/2004  Kim et al.
(Continued)

FOREIGN PATENT DOCUMENTS

JP        2010-218544      9/2010
KR     10-2015-0025287     3/2015
(Continued)

OTHER PUBLICATIONS

English translation of WO 2007129754 A1 (Year: 2007).*
(Continued)

*Primary Examiner* — Grace Q Li
(74) *Attorney, Agent, or Firm* — Nixon & Vanderhye P.C.

(57) ABSTRACT

Disclosed are an electronic apparatus and a method of controlling the same. The electronic apparatus includes: a display; and a processor configured to: control the display to display an image on the display, identify a screen mode of the display displaying an image among a plurality of screen modes having different aspect ratios, and provide information on content corresponding to the identified screen mode among a plurality of pieces of content.

15 Claims, 18 Drawing Sheets

(51) Int. Cl.
*G06F 16/33* (2025.01)
*G06F 16/583* (2019.01)
*G09G 3/20* (2006.01)
*G09G 5/391* (2006.01)

(56) References Cited

U.S. PATENT DOCUMENTS

| | | | | |
|---|---|---|---|---|
| 2010/0026843 | A1* | 2/2010 | Tezuka | H04N 5/2621 |
| | | | | 348/222.1 |
| 2010/0214319 | A1* | 8/2010 | Nakano | G06F 16/583 |
| | | | | 345/652 |
| 2011/0032384 | A1 | 2/2011 | Ono | |
| 2012/0176413 | A1 | 7/2012 | Kulik | |
| 2013/0133013 | A1 | 5/2013 | Kang et al. | |
| 2014/0333671 | A1 | 11/2014 | Phang et al. | |
| 2016/0119685 | A1 | 4/2016 | Jain | |
| 2018/0011551 | A1 | 1/2018 | Gothlin | |
| 2018/0146224 | A1 | 5/2018 | Park | |
| 2022/0141441 | A1 | 5/2022 | Kaneko | |

FOREIGN PATENT DOCUMENTS

| | | | |
|---|---|---|---|
| KR | 10-2016-0046719 | 4/2016 | |
| KR | 10-1947894 | 2/2019 | |
| WO | WO-2007129754 A1 * | 11/2007 | ......... H04N 1/00453 |

OTHER PUBLICATIONS

U.S. Appl. No. 17/103,064, filed Nov. 24, 2020; Lee et al.
International Search Report and Written Opinion issued Mar. 29, 2021 in corresponding International Application No. PCT/KR2020/017165.
Korean Office Action dated Dec. 17, 2024 for KR Application No. 10-2019-0163930.

* cited by examiner

ELECTRONIC APPARATUS AND METHOD OF CONTROLLING THE SAME

CROSS-REFERENCE TO RELATED APPLICATION

This application is a Continuation of U.S. application Ser. No. 17/103,064, filed Nov. 24, 2020, which claims priority to KR 10-2019-0163930, filed Dec. 10, 2019, the entire contents of which are all hereby incorporated herein by reference in their entireties.

BACKGROUND

1. Field

The disclosure relates to an electronic apparatus and a method of controlling the same, and for example, to an electronic apparatus capable of receiving and displaying content from outside, and a method of controlling the same.

2. Discussion of Related Art

An electronic apparatus equipped with a display such as a television (TV) receives a broadcast signal of a predetermined channel and displays an image based on the received broadcast signal.

The electronic apparatus may receive various media content from a server connected through a network such as the Internet as well as a broadcast signal, and display an image based on the media content on a display.

The display may operate in any one of a plurality of screen modes corresponding to different aspect ratios, for example, a landscape mode and a portrait mode to display an image of content.

Recently, as performance of a camera of a smart phone or the like is improved, various media content having high image quality is being produced in the portrait mode as well as the landscape mode, and users may view various content using the electronic apparatus through a search or the like.

Since the electronic apparatus provides information on content, such as a list, as a search result regardless of a screen mode in which the display is currently operating, the provided information may include a plurality of pieces of content that does not match the current screen mode.

When the information on the content that does not match the current screen mode of the electronic apparatus, for example, the content that is shot in the portrait mode by the camera of the smart phone is mainly provided from a television operating in a landscape mode of 16:9, since a user may feel uncomfortable viewing the content, there is a need to consider the current screen mode in providing the information on the content.

SUMMARY

Embodiments of the disclosure provide an electronic apparatus capable of improving user convenience in viewing content by providing information on content corresponding to a current screen mode of a display, and a method of controlling the same.

According to an example embodiment of the disclosure, an electronic apparatus includes: a display; and a processor configured to: control the display to display an image, identify a screen mode of the display displaying an image among a plurality of screen modes having different aspect ratios, and provide information on content corresponding to the identified screen mode among a plurality of pieces of content.

The plurality of screen modes may include a first mode having a width longer than a length and a second mode having the length longer than the width, and the plurality of pieces of content may include first content corresponding to the first mode and has an image with the width longer than the length and second content corresponding to the second mode and has the length longer than the width.

The display may have a screen with the width longer than the length, and the display may be rotatable and may be horizontally positioned in the first mode and vertically positioned in the second mode.

The electronic apparatus may further include: a driver including circuitry configured to drive the display to be rotatable, and the processor may control the driver to rotate the display in the first mode or the second mode.

The processor may be configured to control the driver to rotate the display in the second mode based on identifying that there is no content corresponding to the identified screen mode among the plurality of pieces of content while the display is in the first mode.

The processor may be configured to: search based on receiving an input and receive information on the plurality of pieces of content based on the search.

The processor may be configured to: request the search from an external apparatus and receive the information on the plurality of pieces of content from an external apparatus.

The processor may be configured to request the search by controlling the electronic apparatus to transmit the information on the identified screen mode to the external apparatus.

The processor may be configured to control the display to: display a thumbnail image of the content corresponding to the identified screen mode on the display, and display the image of the content on the display based on the thumbnail image being selected based on the input.

The processor may be configured to: identify a change in a screen mode while displaying the image of the content, and control the display to display information or an image of other content corresponding to the changed screen mode on the display.

The processor may be configured to provide information on the plurality of pieces of content according to a priority of a level corresponding to the identified screen mode.

According to an example embodiment of the disclosure, a method of controlling an electronic apparatus includes: identifying a screen mode of a display displaying an image among a plurality of screen modes having different aspect ratios; and providing information on content corresponding to the identified screen mode among a plurality of pieces of content.

The plurality of screen modes may include a first mode having a width longer than a length and a second mode having the length longer than the width, and the plurality of pieces of content may include first content corresponding to the first mode and has an image with the width longer than the length and second content corresponding to the second mode and has the length longer than the width.

The display may have a screen with the width longer than the length, and the display may be rotatable and may be horizontally positioned in the first mode and vertically positioned in the second mode.

The method of controlling an electronic apparatus may further include: identifying that there is no content corresponding to the identified screen mode among the plurality of pieces of content based on the display being in the first mode; and controlling the display to rotate in the second mode based on the identification.

The method of controlling an electronic apparatus may further include: requesting a search based on receiving an input from an external apparatus; and receiving information on the plurality of pieces of content based on a search based on the input from the external apparatus.

The requesting of the search may include requesting a search by transmitting information on the identified screen mode to the external apparatus.

The method of controlling an electronic apparatus may further include: displaying a thumbnail image of the content corresponding to the identified screen mode on the display, and displaying the image of the content on the display based on the thumbnail image being selected based on the input.

The method of controlling an electronic apparatus may further include: identifying a change in the screen mode while displaying the image of the content; and displaying information or images of other content corresponding to the changed screen mode on the display.

According to an example embodiment of the disclosure, in a non-transitory computer-readable recording medium in which a program of a method executable by a processor of an electronic apparatus is recorded, the method includes: identifying a screen mode of a display displaying an image among a plurality of screen modes having different aspect ratios; and providing information on content corresponding to the identified screen mode among a plurality of pieces of content.

According to example embodiments of an electronic apparatus of the disclosure as described above and the method of controlling the same, it is possible to improve convenience in viewing the content by providing the information on the content corresponding to the current screen mode of the display.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
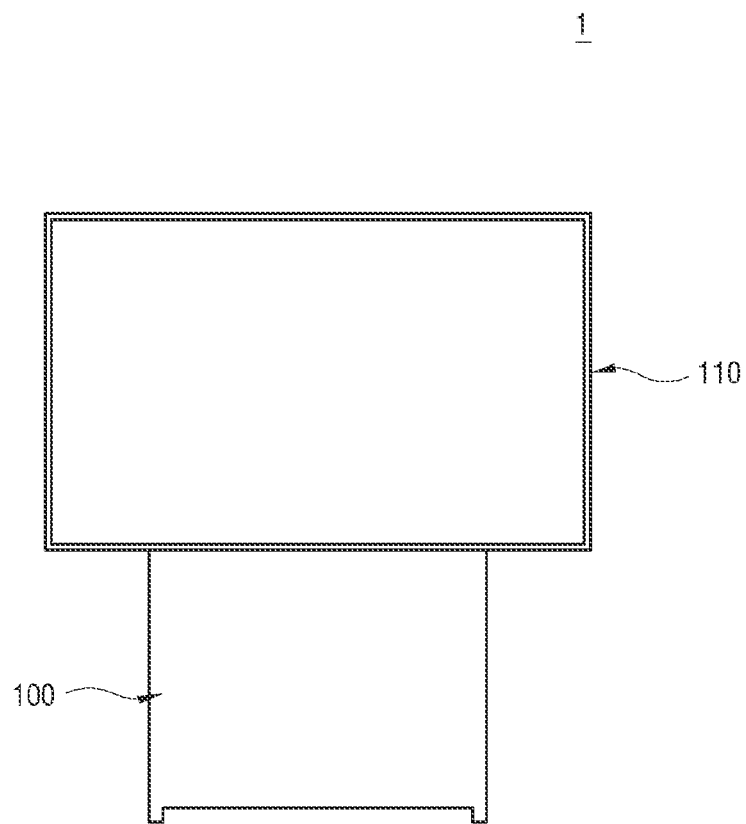
FIG. 1 is a diagram illustrating an example of an electronic apparatus according to various embodiments.

Hereinafter, various example embodiments of the disclosure will be described in greater detail with reference to the accompanying drawings. In the drawings, the same reference numbers or signs refer to components that perform substantially the same function, and the size of each component in the drawings may be exaggerated for clarity and convenience. However, the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof may be omitted.

In embodiments of the disclosure, terms including ordinal numbers such as first and second are used simply for the purpose of distinguishing one component from other components, and singular expressions include plural expressions unless the context clearly indicates otherwise. Also, in embodiments of the disclosure, it should be understood that terms such as 'configured', 'include', and 'have' do not preclude the existence or addition possibility of one or more other features or numbers, steps, operations, components, parts, or combinations thereof. In addition, in an embodiment of the disclosure, a 'module' or a 'unit' performs at least one function or operation, and may be implemented in hardware or software, or a combination of hardware and software, and may be integrated into at least one module. In addition, in embodiments of the disclosure, at least one of the plurality of elements refers to not only all of the plurality of elements, but also each one or all combinations thereof excluding the rest of the plurality of elements.

FIG. 1 is a diagram illustrating an example of an electronic apparatus according to various embodiments.

In an embodiment of the disclosure, as illustrated in FIG. 1, the electronic apparatus 1 may be configured to include a display 110 and a main body 100 supporting the display 110.

As illustrated in FIG. 1, the display 110 may be arranged in a horizontal direction with respect to the main body 100.

According to an embodiment of the disclosure, the electronic apparatus 1 may have a plurality of screen modes having different aspect ratios.

In an embodiment, the plurality of screen modes correspond to the arrangement state of the display 110 and may be implemented to be interchangeable by rotation.

In the disclosure, as illustrated in FIG. 1, among a plurality of screen modes, a landscape mode corresponding to the state in which the display 110 is arranged in the horizontal direction may be referred to, for example, as a first mode. In the first mode, the display 110 is horizontally positioned with respect to the main body 100 and has a screen with a horizontal length longer than a vertical length.

The main body 100 may rotatably support the display 110.

Figure 2:
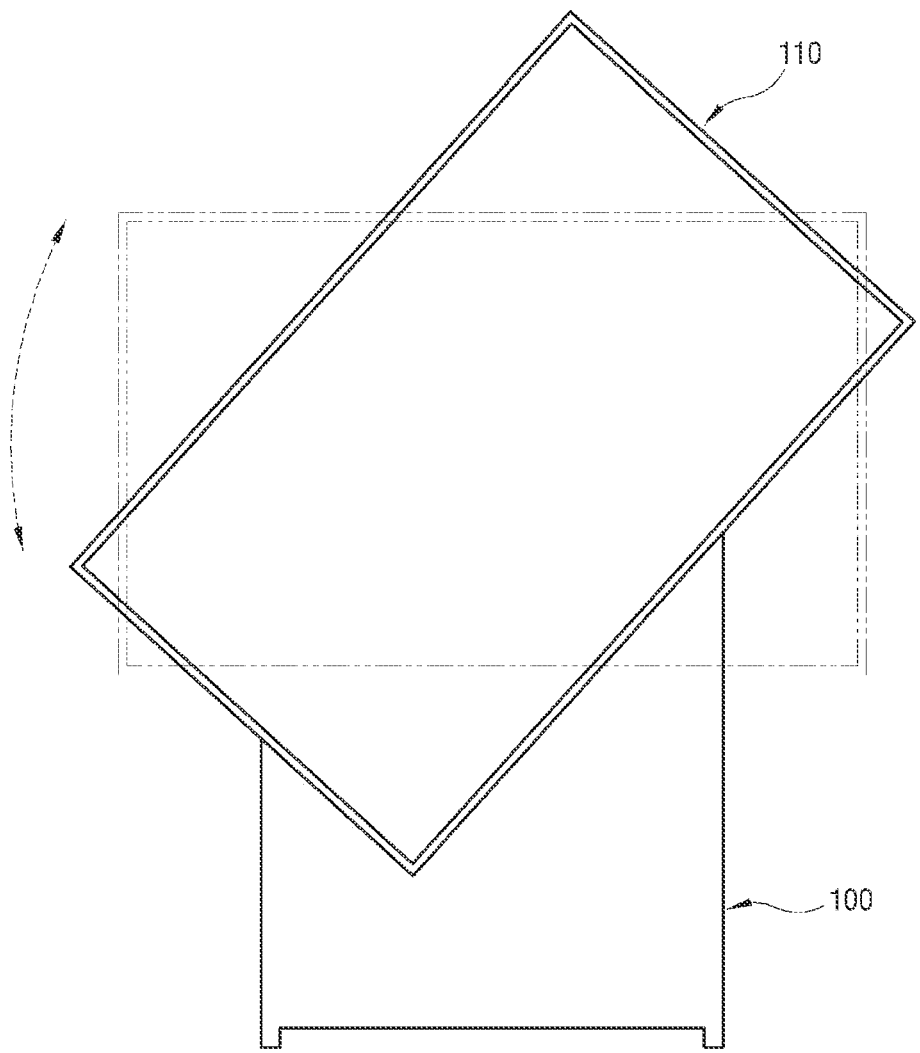
FIG. 2 is a diagram illustrating a state in which the electronic apparatus rotates according to various embodiments.
Figure 3:
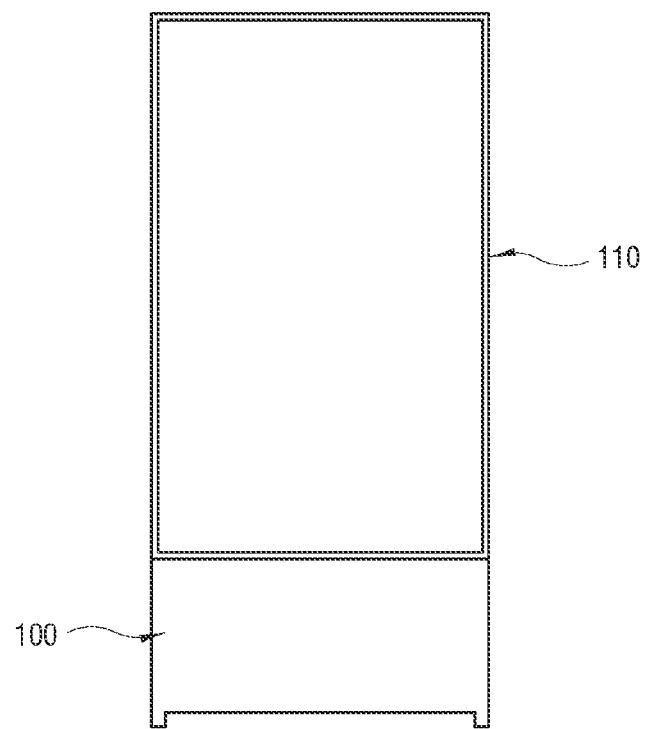
FIG. 3 is a diagram illustrating a state in which the electronic apparatus rotates a display from the state of FIG. 1 according to various embodiments.

FIG. 2 is a diagram illustrating a state in which the electronic apparatus rotates according to various embodiments, and FIG. 3 is a diagram illustrating a state in which the electronic apparatus rotates a display from the state of FIG. 1 according to various embodiments.

As illustrated in FIG. 2, the display 110 may rotate clockwise or counterclockwise from the state of FIG. 1.

In an embodiment, the display 110 may be arranged in a vertical direction with respect to the main body 100 as illustrated in FIG. 3 based on a rotation of a predetermined angle, for example, 90° from the horizontal state of FIG. 1.

In the disclosure, as illustrated in FIG. 3, among the plurality of screen modes, a portrait mode corresponding to the state in which the display 110 is arranged in the vertical direction may be referred to, for example, as a second mode. In the second mode, the display 110 is vertically positioned with respect to the main body 100 and has a screen with a vertical length longer than a horizontal length.

In an embodiment, the display 110 in which the screen mode is the second mode may display, on a full screen, an image produced in the portrait mode, that is, content produced by shooting in a state in which a screen of a smart phone is vertical.

The electronic apparatus 1 according to various embodiments may include a driver (e.g., including circuitry and/or a motor) 150 that rotates the display 110. In an embodiment, the driver 150 may be provided in the main body 100.

The electronic apparatus 1 according to various embodiments may receive a signal provided from an external signal supply source, that is, an image source, for example, data related to predetermined content, and process the received content data according to a preset process and display the processed content data as an image.

In an embodiment, as illustrated in FIGS. 1, 2 and 3, the electronic apparatus 1 may be implemented as a display device equipped with the display 110 that may display an image. However, since the implementation type of the electronic apparatus 1 is not limited, as an embodiment, the electronic apparatus 1 may be implemented as an image processing apparatus such as a set-top box that transmits a signal to a connected separate display.

In an embodiment, the electronic apparatus 1 implemented as the display apparatus may be implemented as a television (TV) capable of processing broadcast video based on at least one of a broadcast signal, broadcast information, or broadcast data that is received from sending equipment of a broadcasting station. In this case, the electronic apparatus 1 may be provided with a tuner for tuning a broadcast signal for each channel.

When the electronic apparatus 1 is a television, the electronic apparatus 1 may receive broadcast content based on at least one of the broadcast signal, the broadcast information, or the broadcast data received from the sending equipment of the broadcasting station through additional devices, such as, a set-top box (STB), a one-connect box, and a media box, that may be directly connected to the electronic apparatus 1 or connected to the electronic apparatus 1 by a cable or the like. A connection method between the electronic apparatus 1 and the additional device is not limited to the cable, and various wired/wireless interfaces may be applied.

The electronic apparatus 1 may wirelessly receive, for example, a radio frequency (RF) signal transmitted from a broadcasting station, that is, broadcast content. To this end, an antenna capable of receiving a signal is provided in the electronic apparatus 1.

In the electronic apparatus 1, the broadcast content can be received through terrestrial waves, cables, satellites, and the like, and the signal source is not limited to the broadcasting station. That is, any apparatus or station capable of transmitting and receiving data may be included in the image source according to the disclosure.

Standards of the signals received from the electronic apparatus 1 may be configured in various ways according to the implementation type of the device, and the electronic apparatus 1 corresponds to an implementation type of an interface circuitry (120 in FIG. 5) to be described later, and may receive, as video content, signals corresponding to standards such as a high definition multimedia interface (HDMI), HDMI-consumer electronics control (HDMI-CFC), display port (DP), DVI, composite video, component video, super video, digital visual interface (DVI), thunderbolt, RGB cable, Syndicat des Constructeurs d'Appareils Radiorécepteurs et Téléviseurs (SCART), and universal serial bus (USB) by wire.

In an embodiment, the electronic apparatus 1 may be implemented as a smart TV or an internet protocol TV (IP TV). The smart TV may receive and display the broadcast signal in real time, and has a web browsing function, so the smart TV is a TV that can provide a convenient user environment for searching and consuming various types of content through the Internet while displaying the broadcast signal in real time. In addition, the smart TV may include an open software platform to provide interactive services to users. Therefore, the smart TV can provide various types of content, for example, content of applications providing predetermined services, to users through the open software platform. These applications are application programs that may provide various types of services, and include, for example, applications that provide services such as SNS, finance, news, weather, maps, music, movies, games, and e-books.

However, since the disclosure is not limited to the implementation example of the electronic apparatus 1, the electronic apparatus 1 may also be applied to various types of implementation examples capable of processing an image, for example, a monitor of a personal computer (PC) such as a desktop or a laptop, in addition to a TV. As another example, the electronic apparatus 1 of the disclosure may be implemented as a terminal equipped with a display that may operate to interchange a plurality of screen modes having different aspect ratios including a smart phone, a smart pad such as a tablet, and the like.

The electronic apparatus 1 may process a signal so that a moving image, a still image, an application, an on-screen display (OSD), a user interface for various operation controls, and the like based on signals/data stored in internal/external storage media are displayed on the screen.

The electronic apparatus 1 may receive content by wired or wireless network communication from various external apparatuses including a content provider that is provided to provide content, and a type of communication is not limited thereto.

For example, the electronic apparatus 1 may receive, as video content, signals corresponding to standards, such as Wi-Fi, Wi-Fi direct, Bluetooth, Bluetooth low energy, Zigbee, ultra-wideband (UWB), near field communication (NFC), through wireless network communication according to the implementation type of the interface circuitry 120 to be described later. In addition, the electronic apparatus 1 may receive a content signal through a wired network communication such as the Ethernet.

Figure 4:
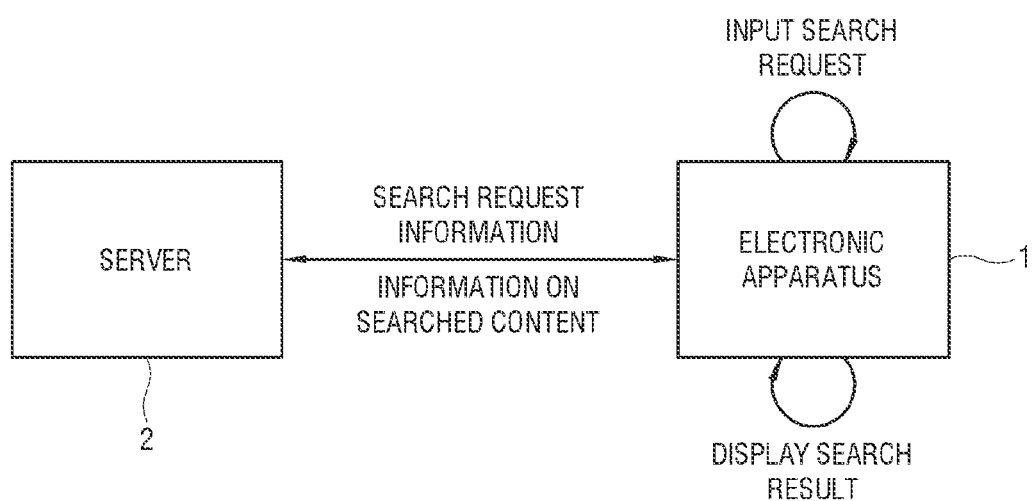
FIG. 4 is a diagram illustrating an example in which the electronic apparatus communicates with an external apparatus.

FIG. 4 is a diagram illustrating an example in which the electronic apparatus communicates with an external apparatus according to various embodiments.

As illustrated in FIG. 4, the electronic apparatus 1 may transmit and receive data by communicating with the server 2 as an example of the external apparatus.

In an embodiment, the server 2 may be provided as the content provider capable of transmitting content to various devices including the electronic apparatus 1 through a wired or wireless network. For example, the server 2 may provide a media file such as a video on demand (VOD), a web content, or the like in a real-time streaming manner.

In an embodiment, the server 2 may provide a plurality of pieces of content, and the plurality of pieces of content may include a first mode, that is, first content that corresponds to a landscape mode and has an image with a width longer than a length, and a second mode, that is, second content that corresponds to a portrait mode and has the length longer than the width.

According to an embodiment, a plurality of servers 2 may be provided. In this case, the electronic apparatus 1 may be implemented to receive various content from each connected server by accessing each of a plurality of servers.

The electronic apparatus 1 may receive media content such as VOD from, for example, a web server such as YouTube or an over the top (OTT) server that can provide an OTT service such as Netflix, or the like.

The electronic apparatus 1 may execute applications for playing content, for example, a VOD application to receive content from the server 2 and process the received content, so an image corresponding to the corresponding content may be output, that is, displayed through the display 110. The electronic apparatus 1 may receive the content from the server 2 using a user account corresponding to the executed application.

In an embodiment, as illustrated in FIG. 4, the electronic apparatus 1 may receive a search request for content from a user. The electronic apparatus 1 may receive, for example, a search request for content corresponding to a predetermined keyword from a user while executing a predetermined application for playing the content.

The electronic apparatus 1 may transmit the input search request information to the server 2 corresponding to the executed application.

The electronic apparatus 1 may receive, from the server 2, information on content based on the transmitted search request information, for example, a content list or a recommendation list for a plurality of pieces of content including input keywords.

In addition, the electronic apparatus 1 may provide the information on the content received from the server 2. For example, the electronic apparatus 1 may display, on the display 110, the content list or the recommendation list received from the server 2 as the search result according to the input search request.

The electronic apparatus 1 according to an embodiment of the disclosure may be implemented to provide information on content corresponding to a current screen mode of the display 110. In an embodiment, the electronic apparatus 1 may identify a screen mode currently in operation of the display 110 and transmit the information on the identified screen mode to the server 2 together with the search request information.

The electronic apparatus 1 may receive the information on the content corresponding to the identified screen mode from the server 2 and provide the information on the content. For example, the electronic apparatus 1 may select the content matching the identified screen mode among the plurality of pieces of content based on the search request, receive the generated content list from the server 2, and display the received content list through the display 110.

When the electronic apparatus 1 receives the displayed information on the content, that is, a user input for selecting any one content from the content list, the electronic apparatus 1 may transmit the information on the selected content to the server 2. That is, the content selected by the user input is selected from the content list provided corresponding to the identified screen mode of the display 110, and becomes content matching the current screen mode.

The electronic apparatus 1 may receive the corresponding content from the server 2 and display an image corresponding thereto on the display 110. Accordingly, the electronic apparatus 1 may display the image of the content corresponding to the screen mode of the display 110.

In an embodiment of the disclosure described above, the case where the electronic apparatus 1 receives the information on the content and the selected content from the same server 2 has been described as an example, but the disclosure is not limited thereto. For example, the disclosure includes the case where the server providing the information on the content and the server providing the content for playback are two different servers.

Hereinafter, various example configurations of the electronic apparatus and the server according to various embodiments will be described in greater detail with reference to the drawings.

Figure 5:
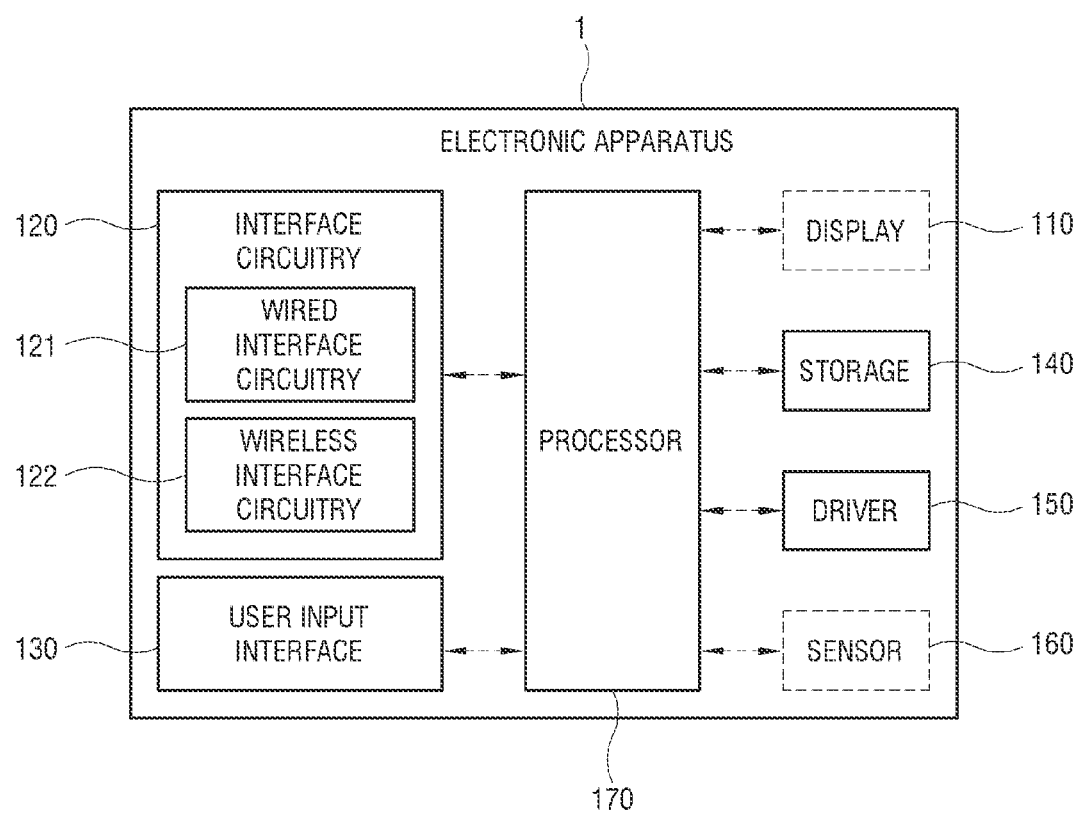
FIG. 5 is a block diagram illustrating an example configuration of the electronic apparatus according to various embodiments.

FIG. 5 is a block diagram illustrating an example configuration of the electronic apparatus according to various embodiments.

As illustrated in FIG. 5, the electronic apparatus 1 according to various embodiments includes the display 110, various interface circuitry 120, a user input interface (e.g., including interface circuitry) 130, a storage 140, a driver (e.g., including driving circuitry and/or a motor) 150, a sensor 160, and a processor (e.g., including processing circuitry) 170. The interface circuitry 120 may include wired interface circuitry 121 and wireless interface circuitry 122.

The configuration of the electronic apparatus 1 according to an embodiment of the disclosure illustrated in FIG. 5 is only an example, and the electronic apparatus according to an embodiment may be implemented in a configuration other than the configuration illustrated in FIG. 5. That is, the electronic apparatus 1 of the disclosure may be implemented in a form in which configurations other than the configurations illustrated in FIG. 5 are added, or at least one of the configurations illustrated in FIG. 5 is excluded. In addition, the electronic apparatus 1 of the disclosure may be implemented in a form in which a part of the configurations configured in FIG. 5 is changed.

The display 110 may display an image.

The implementation scheme of the display 110 is not limited, and the display 110 may be implemented in various display schemes such as liquid crystal, plasma, a light-emitting diode, an organic light-emitting diode, a surface-electron gun conduction electron-emitter, carbon nano-tube, and nano-crystal. In an embodiment, the display 110 may include a display panel displaying an image, and may further include additional configurations, such as a driver, according to the implementation type.

In an embodiment, an image of content received from the server 2 may be displayed on the display 110.

In addition, the information on the content that may be received from the server 2 may be displayed on the display 110. Here, the displayed information on the content may correspond to a search result according to a search request input from a user in the electronic apparatus 1. For example, the displayed information on the content may include a content list corresponding to a search keyword input from a user.

In an embodiment, the display 110 may display information on content corresponding to a screen mode of the electronic apparatus 1, that is, one of a landscape mode and a portrait mode. When the user selects any one content from the displayed information on the content, an image of the selected content may be displayed on the display 110.

The interface circuitry 120 enables the electronic apparatus 1 to communicate with various external apparatuses including the server 2.

The interface circuitry 120 may include various interface circuitry, including, for example, wired interface circuitry 121. The wired interface circuitry 121 may include a connector for transmitting/receiving signals/data according to the standards such as HDMI, HDMI-CFC, USB, component, display port (DP), DVI, thunderbolt, and RGB cable. Here, the wired interface circuitry 121 may include at least one connector, terminal, or port corresponding to each of these standards.

The wired interface circuitry 121 may be implemented in a form including an input port that receives a signal from an image source or the like, and may be provided to transmit and receive signals in both directions by further including an output port in some cases.

The wired interface circuitry 121 may include connectors, ports, or the like according to video and/or audio transmission standards such as an HDMI port, DisplayPort, a DVI port, thunderbolt, composite video, component video, super video, and SCART so that an antenna capable of receiving a broadcast signal according to broadcast standards such as terrestrial/satellite broadcasting may be connected or a cable capable of receiving a broadcast signal according to cable broadcasting standards may be connected. As another example, the electronic apparatus 1 may also include the antenna capable of receiving the broadcast signal.

The electronic apparatus 1 may further include a tuner (not shown) for tuning the received broadcast signal for each channel when the video/audio signal received through the interface circuitry 120 is a broadcast signal. The tuner may include a demodulator that demodulates a tuned broadcast signal of a specific channel and outputs the demodulated broadcast signal as a transport stream (TS) type signal. In other words, the tuner and the demodulator may be designed as a single chip in an integrated form, or may each be implemented as two separate chips.

The wired interface circuitry 121 may include a connector, a port, or the like according to a universal data transmission standard such as a USB port. The wired interface circuitry 121 may include a connector, a port, or the like to which an optical cable may be connected according to an optical transmission standard. The wired interface circuitry 121 is connected to an external microphone or an external audio device having a microphone, and may include a connector or a port capable of receiving or inputting an audio signal from an audio device. The interface circuitry 121 is connected to an audio device such as a headset, an earphone, and an external speaker, and may include a connector, a port, or the like capable of transmitting or outputting an audio signal to the audio device. The wired interface circuitry 121 may include a connector or a port according to a network transmission standard such as the Ethernet. For example, the wired interface circuitry 121 may be implemented as a LAN card or the like which is wired to a router or a gateway.

The wired interface circuitry 121 may be wired to a set-top box, an external apparatus such as an optical media playback device, an external display apparatus, a speaker, a server, or the like through the connector or the port in a 1:1 or 1:N (N is a natural number) manner to receive video/audio signals from the corresponding external apparatus or transmit the video/audio signals to the corresponding external apparatus. The wired interface circuitry 121 may include a connector or a port for separately transmitting video/audio signals.

The wired interface circuitry 121 may be implemented as a communication circuitry including wireless communication modules (S/W module, chip, and the like) corresponding to various kinds of communication protocols.

In an embodiment, the wired interface circuitry 121 may be built in the electronic apparatus 1 according to an embodiment, but may be implemented in the form of a dongle or a module and may be detached from the connector of the electronic apparatus 1.

The interface circuitry 120 may include a wireless interface circuitry 122. The wireless interface circuitry 122 may be implemented in various ways corresponding to the implementation type of the electronic apparatus 1. For example, the wireless interface circuitry 122 may use wireless communications such as radio frequency (RF), Zigbee, Bluetooth, Wi-Fi, ultra wideband (UWB), and near field communication (NFC) as a communication method.

The wireless interface circuitry 122 may be implemented as a communication circuitry including wireless communication modules (S/W module, chip, and the like) corresponding to various kinds of communication protocols.

In an embodiment, the wireless interface circuitry 122 may include a wireless LAN unit. The wireless LAN unit may be wirelessly connected to an external apparatus through an access point (AP) under the control of the processor 170. The wireless LAN unit includes a WiFi module.

In an embodiment, the wireless interface circuitry 122 may include a wireless communication module that wirelessly supports one-to-one direct communication between the electronic apparatus 1 and an external apparatus without the access point. The wireless communication module may be implemented to support communication methods such as Wi-Fi direct, Bluetooth, and Bluetooth low energy. When the electronic apparatus 1 directly communicates with an external apparatus, the storage 140 may store identification information (for example, a MAC address or an IP address) on an external apparatus that is a communication target device.

In the electronic apparatus 1 according to an embodiment, the wireless interface circuitry 122 may be provided to perform wireless communication with an external apparatus by at least one of a wireless LAN unit and a wireless communication module according to performance In an embodiment, the wireless interface circuitry 122 may further include a communication module including various communication circuitry using various communication methods such as mobile communication such as LTE, EM communication including a magnetic field, and visible light communication.

The wireless interface circuitry 122 may wirelessly communicate with the server 2 on the network to transmit and receive a data packet to and from the server 2.

The wireless interface circuitry 122 may include an IR transmitter and/or an IR receiver capable of transmitting and/or receiving an infrared (IR) signal according to an infrared communication standard. The wireless interface circuitry 122 may receive or input a remote control signal from the remote control or other external apparatuses through the IR transmitter and/or the IR receiver, or transmit or output the remote control signal to other external apparatuses. As another example, the electronic apparatus 1 may transmit and receive the remote control signal with the remote control or other external apparatuses through the wireless interface circuitry 122 of other methods such as Wi-Fi or Bluetooth.

In an embodiment, the wireless interface circuitry 122 may transmit predetermined data as information on a user voice received through a sound receiver such as a microphone to the external apparatus such as a server. Here, the type/kind of transmitted data is not limited, and may include, for example, an audio signal corresponding to a voice uttered by a user, a voice feature extracted from an audio signal, and the like.

In addition, the wireless interface circuitry 122 may receive data of a processing result of the corresponding user voice from the external apparatus such as the server. The electronic apparatus 1 may output a sound corresponding to a result of processing a voice based on the received data through an internal or external loudspeaker.

In the above-described embodiment, as an example, the user voice may not be transmitted to the server, but may be processed by itself in the electronic apparatus 1. That is, in an embodiment, the electronic apparatus 1 may be implemented to perform the role of an STT server.

The electronic apparatus 1 may communicate with an input device such as a remote control through the wireless interface circuitry 122 to receive a sound signal corresponding to the user voice from the input device.

In the electronic apparatus 1 according to an embodiment, a communication module communicating with the external server 2 or the like and a communication module communicating with a remote control may be different from each other. For example, the electronic apparatus 1 may communicate with the server 2 through an Ethernet modem or a Wi-Fi module, and communicate with a remote control and a Bluetooth module.

In the electronic apparatus 1 according to an embodiment, a communication module communicating with the external server 2 or the like and a communication module communicating with a remote control may be the same as each other. For example, the electronic apparatus 1 may communicate with the server 2 and the remote control through a Bluetooth module.

The user input interface 130 may include various interface circuitry and may transmit various preset control commands or unlimited information to the processor 170 by user input.

The electronic apparatus 1 according to an embodiment of the disclosure may transmit the signal corresponding to the corresponding search request to the server 2 based on the search request according to the user input through the user input interface 130. In addition, the user input interface 130 may receive the information on the content received from the server 2, for example, a user input for selecting any one content from a content list.

The user input interface 130 may include a keypad (or input panel) including buttons such as a power key, a number key, and a menu key provided on the main body of the electronic apparatus 1.

In an embodiment, the user input interface 130 may include an input apparatus that generates a preset command/data/information/signal to be able to remotely control the electronic apparatus 1 and transmits the generated preset command/data/information/signal to the electronic apparatus 1. The input apparatus may include a remote control, a keyboard, a mouse, and the like, and may be separated from the main body of the electronic apparatus 1 to receive the user input. The remote control may be provided with a touch detector that receives a user's touch input and/or a motion detector that detects motion of the remote control occurred by a user. The input device may include a terminal device such as a smart phone in which a remote control application is installed. In this case, the touch input may receive the user's touch input through the touch screen.

The input device may become an external apparatus capable of the wireless communication with the main body of the electronic apparatus 1, and the wireless communication includes the Bluetooth, the infrared communication, the RF communication, the wireless LAN, the Wi-Fi Direct, and the like.

In an embodiment, the user input interface 130 may further include a voice input interface that receives voice/sound uttered from the user. The voice input interface may be implemented as a microphone capable of receiving user voice.

The storage 140 is configured to store various data of the electronic apparatus 1.

The storage 140 should store data even when power supplied to the electronic apparatus 1 is cut off, and may be provided as a writable nonvolatile memory (writable ROM) to reflect fluctuations. That is, the storage 140 may be provided as any one of a flash memory, EPROM, or EEPROM. The storage 140 may further include a volatile memory such as DRAM or SRAM in which the read or write speed of the electronic apparatus 1 is faster than that of the nonvolatile memory.

In an embodiment, the storage 140 may store extended display identification data (EDID), in which the EDID includes information on resolution of the display 110 that displays an image. In this specification, the EDID is used as a term including E-EDID.

Data stored in the storage 140 may include, for example, various programs, applications, image data that can be executed on the operating system, image data, additional data, and the like, in addition to an operating system for driving the electronic apparatus 1.

For example, the storage 140 may store input/output signals or data corresponding to the operation of each component under the control of the processor 170. The storage 140 stores a control program for controlling the electronic apparatus 1, a UI related to an application provided by a manufacturer or downloaded from the outside, images for providing the UI, user information, documents, databases, or related data.

In an embodiment, the storage 140 may store a TV application or a TV client as a program for causing the electronic apparatus 1 to operate as a television, a VOD application as a program for playing content received from the server 2, and the like.

For example, at least one application, for example, a VOD application, for receiving and playing content provided by the server 2 is installed or stored in the storage 140. YouTube applications or Netflix applications are examples of playback applications of such content.

The playback application installed as described above may be executed in a foreground mode in the electronic apparatus 1, so the electronic apparatus 1 may receive and play, that is, display the media file, the web content, or the like from the server 2 in the real-time streaming manner.

In the electronic apparatus 1 according to an embodiment, a predetermined user input for searching for playable content may be received while the playback application is executed in the foreground mode. For example, the electronic apparatus 1 may receive, from the server 2, content data for content selected by a user from the content provided from the playback application, and display the content image corresponding to the received content.

In an embodiment, the image displayed on the electronic apparatus 1 may be come from data stored in the nonvolatile storage 140 such as a flash memory or a hard disk. The storage 140 may be provided inside or outside the electronic apparatus 1, and when the storage 140 is provided outside the electronic apparatus 1, the storage 140 may be connected to the electronic apparatus 1 through the wired interface circuitry 121.

In an embodiment, the term storage may include the storage 140, a ROM (not illustrated) and RAM (not illustrated) in the processor 170, or a memory card (not illustrated) (for example, a micro SD card and a memory stick) mountable in the electronic apparatus 1.

The driver 150 may provide power to rotate the display 110.

The driver 150 may include various circuitry and be implemented as a motor having a rotating shaft capable of forward or reverse rotation, for example.

The display 110 is mounted on the rotating shaft of the motor, and when the rotating shaft rotates as the driver 150 is driven, may rotate in a forward or reverse direction corresponding thereto.

In an embodiment, the electronic apparatus 1 may switch the display 110 between a plurality of screen modes, for example, a first mode (landscape mode) and a second mode (portrait mode), based on the rotation of the driver 150. The switching of the screen mode may be performed based on the user input.

The sensor 160 may detect the screen mode of the display 110 or the switching of the screen mode.

In an embodiment, the sensor 160 may be provided inside the main body 100 to detect a rotation angle or a rotation state of the display 110.

The sensor 160 may be implemented in a gyroscope that measures a change in orientation of an object using the property of always maintaining a predetermined direction set at the beginning, or an acceleration sensor that may detect the movement of the display 110, that is, the rotation.

The processor 170 may include various processing circuitry and performs control to operate the overall configurations of the electronic apparatus 1. The processor 170 may include control programs (or instructions) for performing the control operation, a nonvolatile memory in which control programs are installed, a volatile memory in which at least a part of the installed control programs is loaded, and at least one general-purpose processor, such as a microprocessor, an application processor, or a central processing unit (CPU), for executing the loaded control programs.

The processor 170 may include a single core, a dual core, a triple core, a quad core, or a multiple-number core thereof. The processor 170 may include a plurality of processors, for example, a main processor and a sub processor operating in a sleep mode (for example, only standby power is supplied and does not operate as a display apparatus). In addition, the processor, the ROM, and the RAM can be interconnected via an internal bus.

In an embodiment, the processor 170 may include an image processor that performs various preset processes on the content signal received from the server 2. The processor 170 may output the generated or combined output signals to the display 110 by performing the image processing, and as a result, displays an image corresponding to an image signal on the display 110.

The image processor may include a decoder that decodes an image signal to correspond to an image format of the electronic apparatus 1, and a scaler that adjusts the image signal to match an output standard of the display 110.

In an embodiment, the decoder may be, for example, an H.264 decoder, but is not limited thereto. For example, the video decoder according to an embodiment may be implemented as a decoder according to various compression standards such as a moving picture experts group (MPEG) decoder or a high efficiency video codec (HEVC) decoder.

In addition, the type of content processed by the image processor in the disclosure is not limited. For example, the content that may be processed by the image processor may further include not only a moving image such as a video, but also still images such as a picture such as a JPEG file and a background screen, and a graphical user interface (GUI).

The type of the image processing process performed by the image processor of the disclosure is not limited, and the image processor may perform at least one of various processes such as de-interlacing that converts an interlace type broadcast signal into a progressive type, noise reduction for improving an image quality, detail enhancement, frame refresh rate conversion, and line scanning In an embodiment, the image processor may be implemented as an image board in which various circuit configurations, such as various chipsets, memories, electronic components, and wirings, for performing each of the processes are mounted on a printed circuit board (PCB). In this case, in the electronic apparatus 1, the processor 170 including the tuner and the image processor may be provided on a single image board. This is only an example, and these components may be provided on a plurality of printed circuit boards communicatively connected to each other.

In the electronic apparatus 1 according to an embodiment of the disclosure, the processor 170 may process the corresponding signal so that an image of a predetermined channel is displayed based on a broadcast signal. In addition, the processor 170 processes the corresponding signal to display an image of predetermined content based on the signal received from the server 2 through the interface circuitry 120.

In an embodiment, the processor 170 may be implemented as a form included in a main SoC mounted on a PCB embedded in the electronic apparatus 1.

The control program may include a program(s) implemented in at least one of a BIOS, a device driver, an operating system, firmware, a platform, and an application program. As an embodiment, the application may be pre-installed or stored in the electronic apparatus 1 at the time of manufacturing of the electronic apparatus 1, or installed in the electronic apparatus 1 based on data of the application received from the outside when used later. The data of the application may be downloaded to the electronic apparatus 1 from an external server such as an application market. Such an external server is an example of a computer program product of the disclosure, but is not limited thereto.

The control program may be recorded on a storage medium that may be read by a device such as a computer. The machine-readable storage medium may be provided in a form of a non-transitory storage medium. The 'non-transitory storage medium may be a storage medium that is a tangible device, and may not include a signal (for example, electromagnetic waves), and the term does not distinguish between the case where data is stored semi-permanently on a storage medium and the case where data is temporarily stored thereon. For example, the 'non-transitory storage medium' may include a buffer in which data is temporarily stored.

Figure 6:
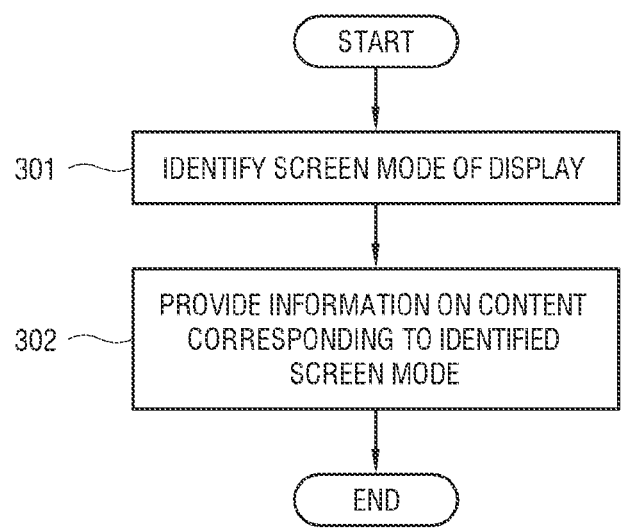
FIG. 6 is a flowchart illustrating an example operation of controlling the electronic apparatus according to various embodiments.

FIG. 6 is a flowchart illustrating an example operation of controlling the electronic apparatus according to various embodiments.

In an embodiment of the disclosure, as illustrated in FIG. 6, the processor 170 of the electronic apparatus 1 may identify a screen mode of the display 110 displaying an image among a plurality of screen modes having different aspect ratios, that is, a first mode and a second mode (301), and provide the information on the content corresponding to the identified screen mode among the plurality of pieces of content that may be provided from the server 2 (302).

As an embodiment, the operation of the processor 170 as described above may be implemented as a computer program stored in a computer program product (not illustrated) separately provided from the electronic apparatus 1.

In this case, the computer program product includes a memory in which an instruction corresponding to the computer program is stored, and a processor. When executed by the processor, the instruction includes identifying a screen mode of the display 110 that displays an image among the plurality of screen modes, and providing the information on the content corresponding to the identified screen mode among the plurality of pieces of content.

As a result, the electronic apparatus 1 may download and execute the computer program stored in the separate computer program product to perform the operation of the processor 170.

Figure 7:
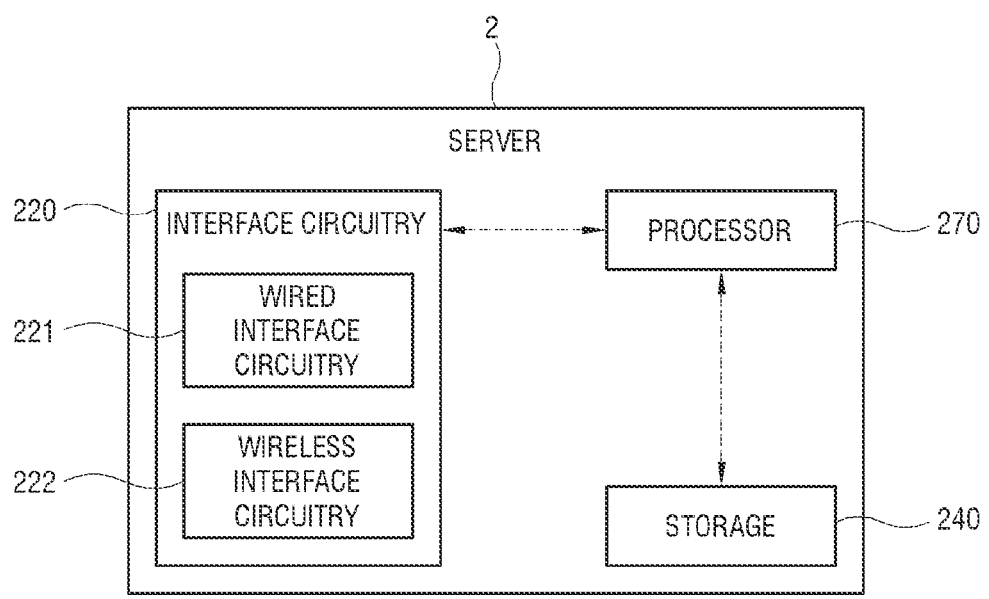
FIG. 7 is a block diagram illustrating an example configuration of a server according to various embodiments.

FIG. 7 is a block diagram illustrating an example configuration of a server according to various embodiments.

As illustrated in FIG. 7, the server 2 according to an embodiment of the disclosure includes interface circuitry 220, a storage 220, and a processor (e.g., including processing circuitry) 270. The interface circuitry 220 may include wired interface circuitry 211 and wireless interface circuitry 212.

The configuration included in the server 2 is not limited to the above-described embodiment, and may be implemented by excluding or changing some configurations or including additional other configurations. In addition, since the configuration having the same name as the configuration of the electronic apparatus 1 among the configurations of the server 2 may be implemented in the same or similar form, a duplicate description thereof may not be repeated here.

The interface circuitry 220 is provided so that the server 2 may communicate with various external apparatuses including the electronic apparatus 1 in a wired or wireless communication manner. The interface circuitry 220 may be implemented as circuitry including the wired and/or wireless communication module and the communication modules (S/W module, chip, and the like) corresponding to the predetermined communication protocol.

The storage 240 is configured to store various data of the server 2.

In an embodiment, the storage 240 may store various types of content that may be provided to the external apparatuses including the electronic apparatus 1.

In an embodiment, the server 2 may store user account information. The user account information may include security information. In addition, the account information may further include information on an electronic device using a corresponding user account, for example, the electronic apparatus 1.

The processor 270 may include various circuitry and performs control to operate the overall configurations of the server 2.

Figure 8:
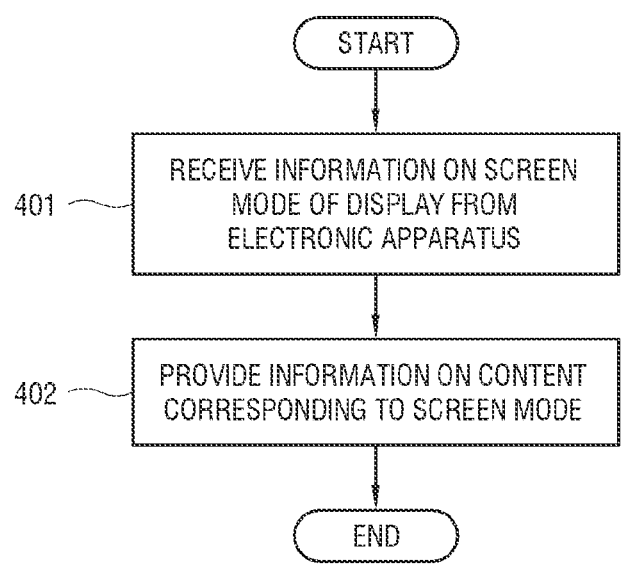
FIG. 8 is a flowchart illustrating an example operation of controlling the server according to various embodiments.

FIG. 8 is a flowchart illustrating an example operation of controlling the server according to various embodiments.

In an embodiment of the disclosure, the processor 270 of the server 2 may receive screen mode information of the display 110 from the electronic apparatus 1 through the interface circuitry 220 (401). Here, the screen mode information of the display 110 of the electronic apparatus 1 may indicate the current screen mode of the display 110, that is, the landscape mode or the portrait mode.

In an embodiment, the screen mode information may be received together with search request information according to the user's search request input from the electronic apparatus 1.

In an embodiment, the screen mode information may be received from the electronic apparatus 1 as data separate from the search request information. Here, the screen mode information may be received by the server 2 periodically or upon occurrence of a predetermined event such as a screen mode change in the electronic apparatus 1.

The processor 270 may provide the information on the content corresponding to the received screen mode to the electronic apparatus 1 through the interface circuitry 220 (402). Here, the processor 270 may provide the electronic apparatus 1 with the information on the content that matches the screen mode of the display 110 among the plurality of pieces of content searched from the content stored in the storage 240 based on the received search request information.

As an embodiment, the operation of the processor 270 as described above may be implemented as a computer program stored in a computer program product (not illustrated) separately provided from the server 2.

In this case, the computer program product includes a memory in which an instruction corresponding to the computer program is stored, and a processor. When executed by the processor, the instruction includes receiving the screen mode information of the display 110 from the electronic apparatus 1 and providing the information on the content corresponding to the received screen mode to the electronic apparatus 1.

As a result, the electronic apparatus 1 may download and execute the computer program stored in the separate computer program product to perform the operation of the processor 170.

Hereinafter, various example embodiments of providing the information on the content and the image thereof in the disclosure electronic apparatus will be described in greater detail with reference to the drawings.

Figure 9:
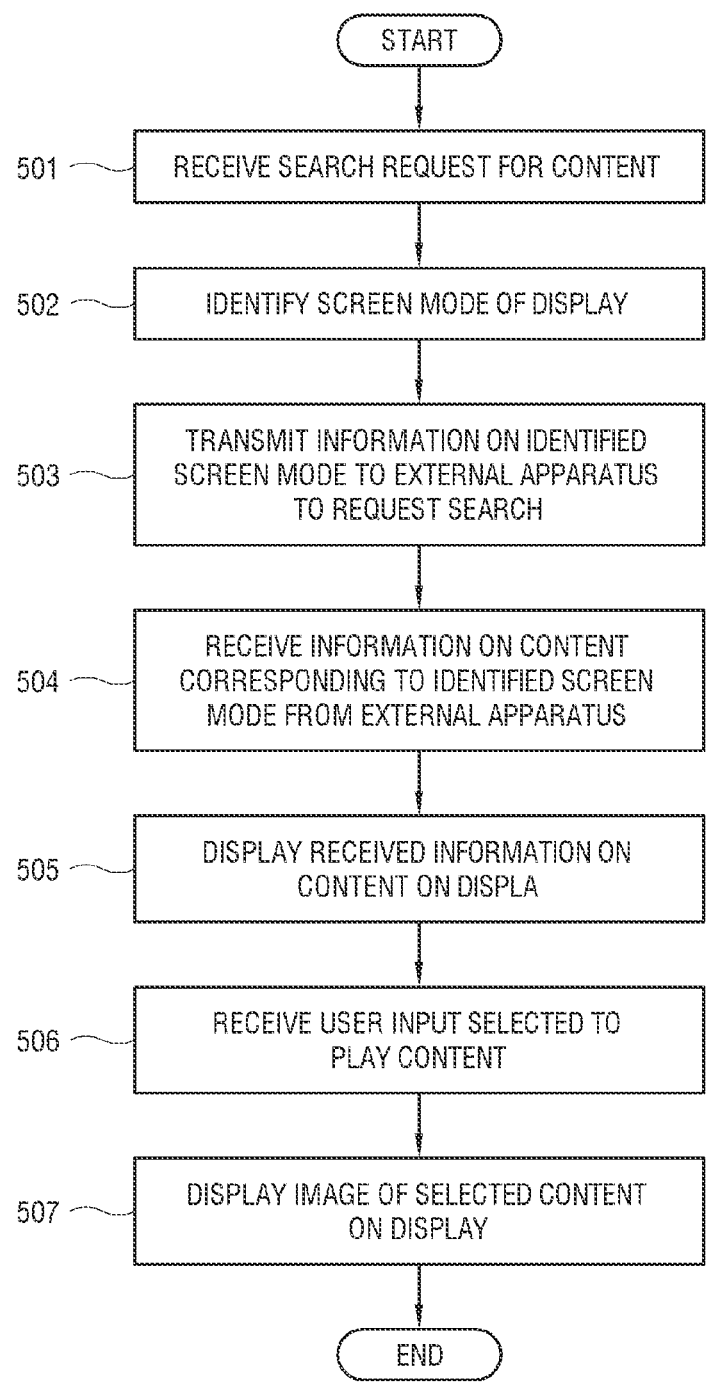
FIG. 9 is a flowchart illustrating an example method of controlling an electronic apparatus according to various embodiments.
Figure 10:
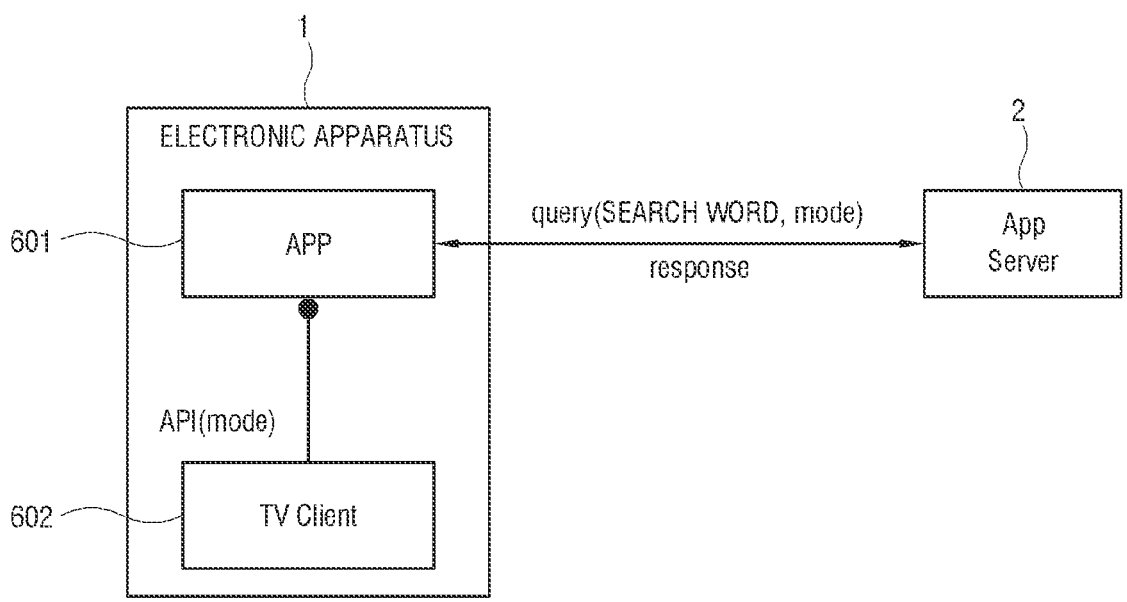
FIG. 10 is a diagram illustrating an example operation of the electronic apparatus of FIG. 9 according to various embodiments.

FIG. 9 is a flowchart illustrating an example method of controlling an electronic apparatus according to various embodiments, and FIG. 10 is a diagram illustrating an example operation of the electronic apparatus in FIG. 9 according to various embodiments.

As illustrated in FIG. 9, the electronic apparatus 1 may receive a search request for content from a user (501).

In an embodiment, the processor 170 may receive a search request for content related to a search word based on the input of a predetermined keyword as the search word from the user through the user input interface 130.

Here, the electronic apparatus 1 may receive a user input for executing a predetermined application for playing content, for example, a VOD application. As illustrated in FIG. 10, the processor 170 may cause the corresponding application 601 to be executed by calling an API of the playback application 601 from a running TV client 602.

Figure 11:
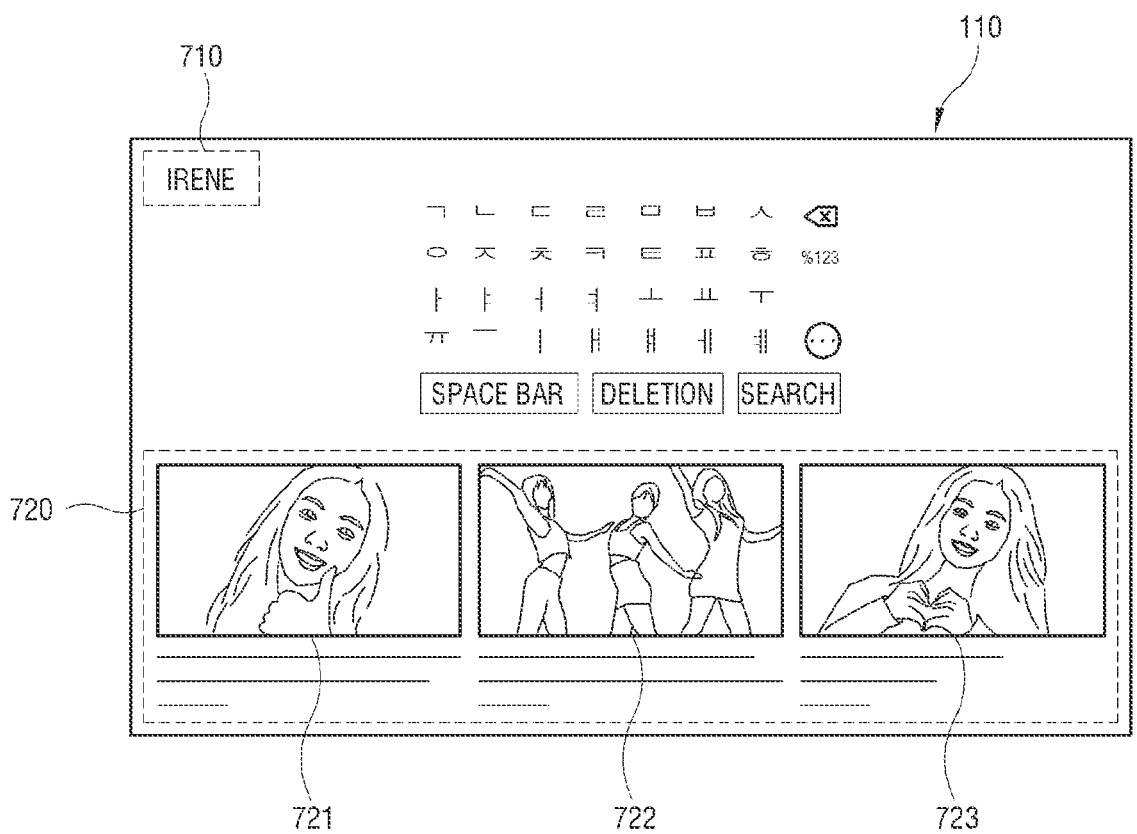
FIG. 11 is a diagram illustrating an example of a screen on which the electronic apparatus is displayed in a first mode according to various embodiments.

FIG. 11 is a diagram illustrating an example of a screen on which the electronic apparatus is displayed in a first mode according to various embodiments.

As illustrated in FIG. 11, a user may perform a search request by inputting a specific search word 710 corresponding to a keyword for content search using a virtual keypad displayed on the display 110, for example, while the playback application is executing.

The processor 170 may identify a screen mode of the display 110 based on the search request received in operation 501 (502).

The processor 170 may identify whether the current screen mode of the display 110 is a first mode, that is, a landscape mode or a second mode, that is, a portrait mode.

In an embodiment, the processor 170 may identify the screen mode based on information on resolution of the display 110. For example, the processor 170 may read the EDID from the storage 140 to acquire information on the screen mode.

In an embodiment, the processor 170 may acquire information on a rotation state of the display 110 from the sensor 160 to identify the screen mode.

Figure 17:
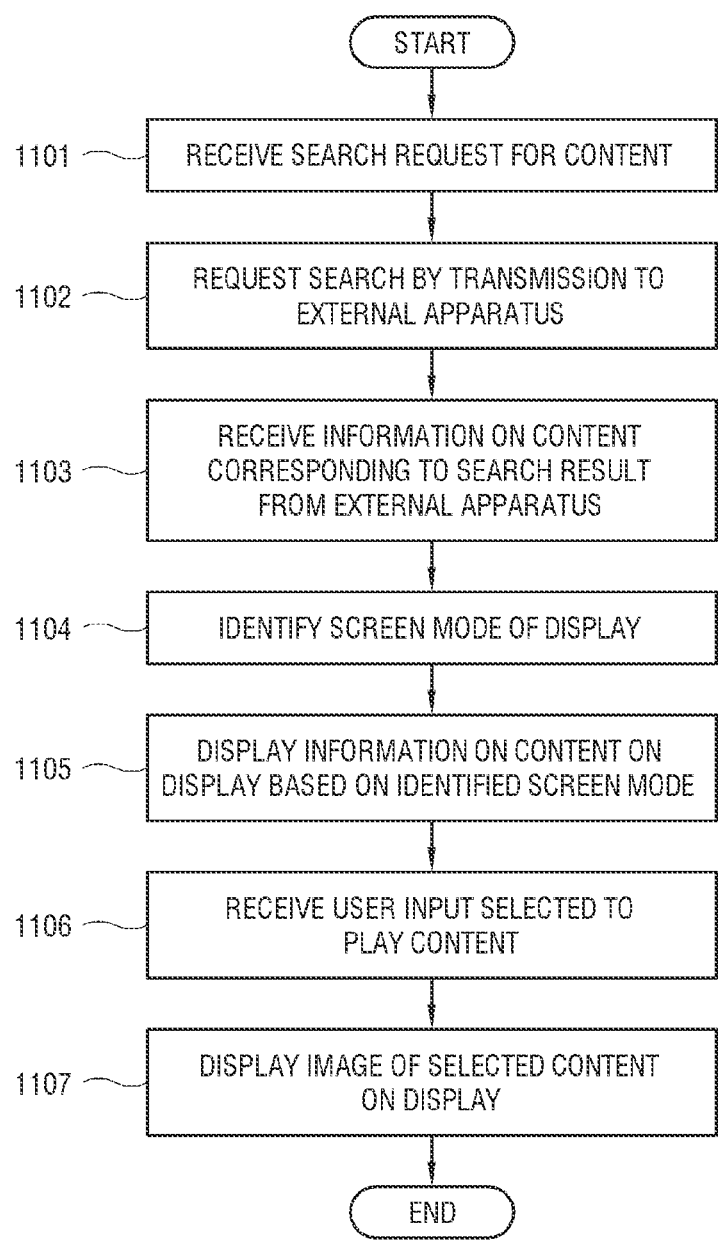
FIG. 17 is a flowchart illustrating an example method of controlling an electronic apparatus according to various embodiments.

As illustrated in FIG. 17, the processor 170 may transmit the information on the screen mode identified in operation 502 to an external apparatus, for example, the server 2 corresponding to the executed application through the interface circuitry 120 to request the search.

In an embodiment, as illustrated in FIG. 10, the processor 170 may transmit a query including information on the search word input in operation 501 and information on the screen mode identified in operation 502 to the server 2 to transmit the search request to the server 2.

Here, the information on the screen mode transmitted to the server 2 may include, for example, the information on the resolution of the display 110. The server 2 may identify whether the screen mode of the electronic apparatus 1 corresponds to the first mode or the second mode, based on the information on the resolution received from the electronic apparatus 1. Accordingly, the server 2 may provide the information on the content corresponding to the identified screen mode to the electronic apparatus 1.

However, in the electronic apparatus 1 of the disclosure, the information on the screen mode transmitted to the server 2 is not limited to the information on the resolution, and may be implemented as various types or forms of data.

For example, the processor 170 may assign a predetermined value (1 or 0) to a predetermined bit of data transmitted when the search request is requested in order to indicate the screen mode of the display 110, thereby transmitting the information on the screen mode to the server 2. The server 2 may read bits, to which the value of the screen mode is assigned, from the received data to identify the screen mode of the display 110 of the electronic apparatus 1.

Accordingly, the server 2 may provide the information on the content corresponding to the identified screen mode to the electronic apparatus 1.

Referring back to FIG. 9, the case in which the information on the screen mode is transmitted together with the search request information has been described as an example, but the disclosure is not limited thereto.

That is, as an embodiment, the case in which the electronic apparatus 1 is implemented to transmit the screen mode information to the server 2 as separate data from the search request information is also included in the disclosure.

As an embodiment, the electronic apparatus 1 may periodically transmit the screen mode information to the server 2. Accordingly, the server 2 may periodically update the screen mode of the electronic apparatus 1 to select the content matching the current screen mode when the search request is received from the electronic apparatus 1.

As an embodiment, when the change in the screen mode is detected, the electronic apparatus 1 may transmit the information on the changed screen mode to the server 2. Accordingly, the server 2 may periodically update the information on the screen mode of the electronic apparatus 1 so that the information on the screen mode corresponds to the latest change, thereby selecting the content matching the current screen mode when the search request is received from the electronic apparatus 1.

The processor 170 may receive, as a response to the information transmitted in operation 503, the information on the content corresponding to the identified screen mode from the external apparatus, that is, the server 2 through the interface circuitry 120 (504).

Here, the information on the received content is related to the search word input in operation 501, and may include information on a plurality of pieces of content corresponding to the information on the screen mode transmitted in operation 503.

The processor 170 may display the information on the content received in operation 504 on the display 110 (505).

Specifically, the processor 170 may control the display 110 to display a content list including the plurality of pieces of content that is related to the search word input in operation 501 and corresponds to the information on the screen mode transmitted in operation 503, based on the information on the content received in operation 504.

For example, as illustrated in FIG. 11, when the display 110 is in the first mode (landscape mode), a content list 720 including content items 721, 722, and 723 corresponding to the first mode may be displayed on the display 110 as the search result of the content corresponding to the search word 710.

As illustrated in FIG. 11, the content items 721, 722, and 723 of the content list 720 may include a thumbnail image of the corresponding content. Here, it may be confirmed that the searched content corresponds to the current screen mode of the display 110, that is, the first mode through the displayed thumbnail image.

Figure 12:
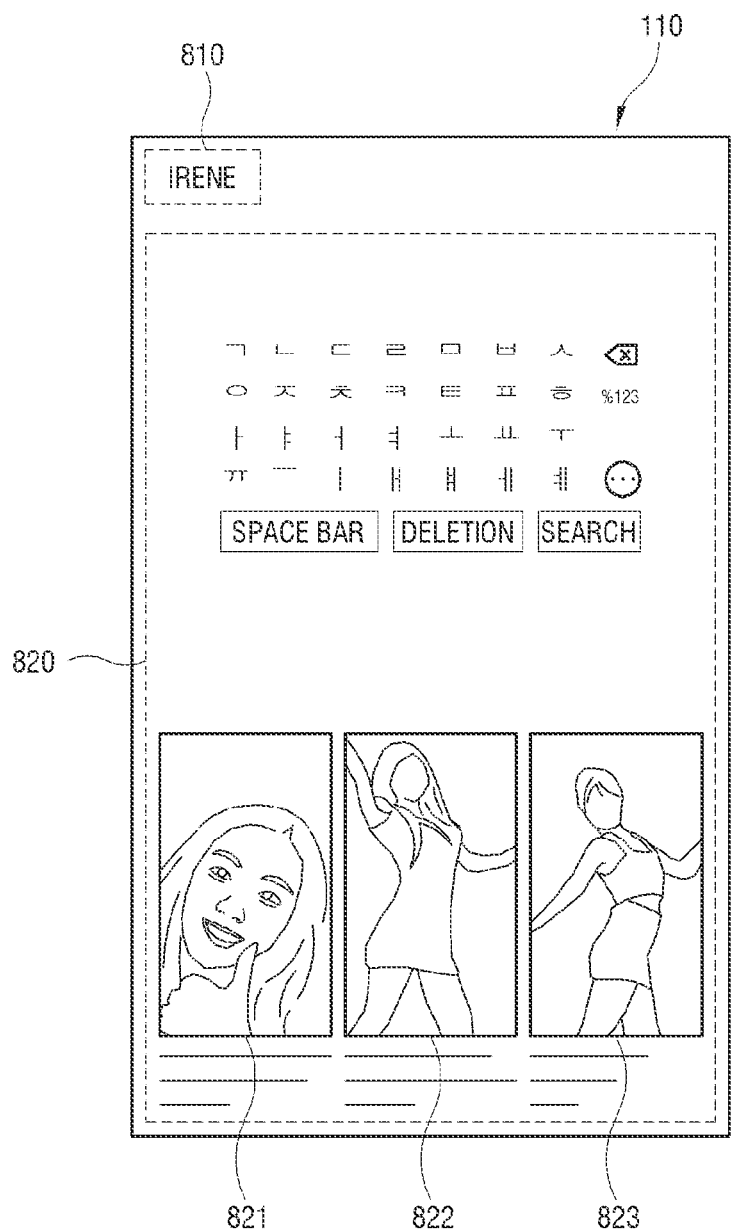
FIG. 12 is a diagram illustrating an example of a screen on which the electronic apparatus is displayed in a second mode according to various embodiments.
Figure 13:
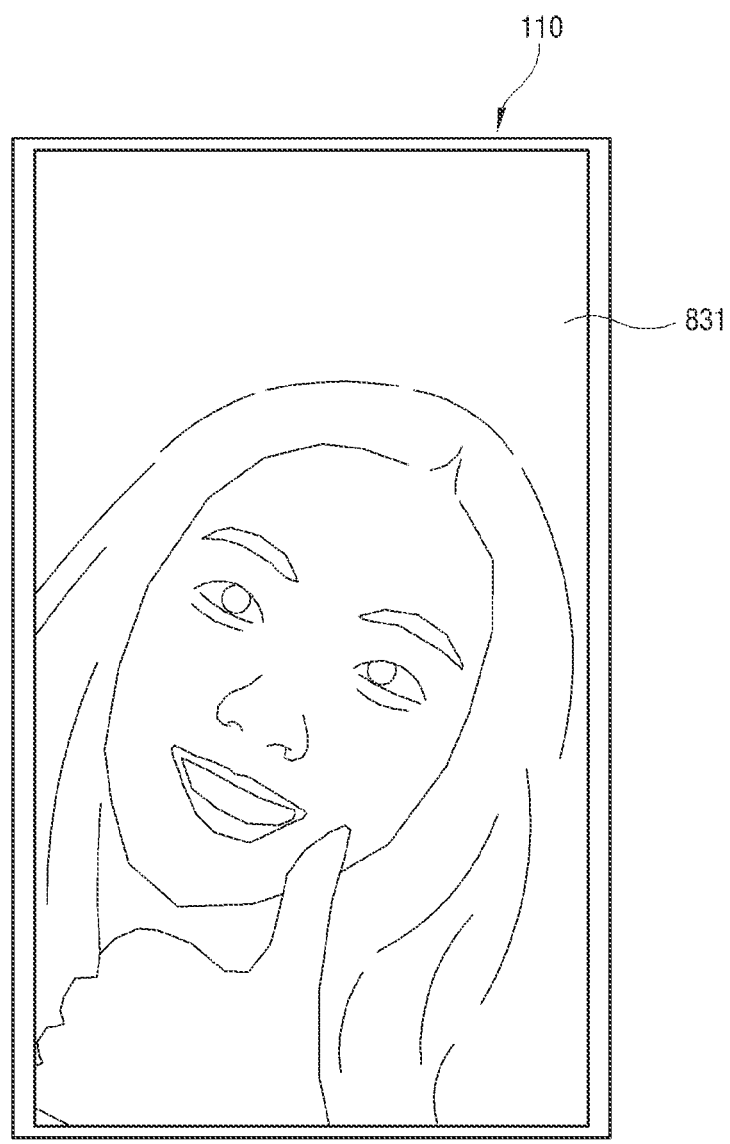
FIG. 13 is a diagram illustrating an example of a screen on which the content selected in FIG. 12 is displayed according to various embodiments.

FIG. 12 is a diagram illustrating an example of a screen on which the electronic apparatus according to is displayed in a second mode according to various embodiments, and FIG. 13 is a diagram illustrating an example of a screen on which the content selected in FIG. 12 is displayed according to various embodiments.

As an example, as illustrated in FIG. 12, when the display 110 is in the second mode (portrait mode), a content list 820 including content items 821, 822 and 823 corresponding to the second mode may be displayed on the display 110 as the search result of the content corresponding to the search word 810.

As illustrated in FIG. 12, the content items 821, 822, and 823 of the content list 820 may include a thumbnail image of the corresponding content. Here, it may be confirmed that the searched content corresponds to the current screen mode of the display 110, that is, the first mode through the displayed thumbnail image.

The processor 170 may receive a user input for selecting any one content to be played for the content information displayed in operation 505 (506).

The processor 170 may receive the user input for selecting, for example, any one of the content items 721, 722, 723 illustrated in FIG. 11 or the content items 821, 822, 823 illustrated in FIG. 12, that is, the thumbnail images in the content list 820.

The processor 170 may display the image of the selected content on the display 110 based on the user input received in operation 506 (507).

For example, as illustrated in FIG. 12, when any one item 821, that is, the thumbnail image is selected from the content list 820 including the content items 821, 822, and 823 corresponding to the second mode, the processor 170 may receive the data of the content corresponding to the selected item 821 from the server 2 through the interface circuitry 120 and control the display 110 to display the image 831 of the received content.

Accordingly, as illustrated in FIG. 13, when the display 110 is in the second mode (portrait mode), the content corresponding to the second mode, which is the current screen mode, can be displayed on a full screen.

In an embodiment, the processor 170 may continuously play a plurality of pieces of content based on the search result. For example, when the playback of the content corresponding to the selected item 821 among the content items 821, 822, and 823 is completed, the processor 170 may continuously play the content corresponding to the next item 822. Likewise, when the playback of the content corresponding to the item 822 is completed, the processor 170 may continuously play the content corresponding to the next item 833.

The continuous playback setting is performed by a user selection as an option of the playback application as an example, and may be performed until the playback of all content in the content list or the recommendation list is completed.

As described above, in the electronic apparatus 1 according to an embodiment, the information on the identified screen mode may be provided to the server 2 to display the content corresponding to the current screen mode, so it is possible to provide more convenience to a user in viewing content compared to when the screen mode is not identified.

Figure 14:
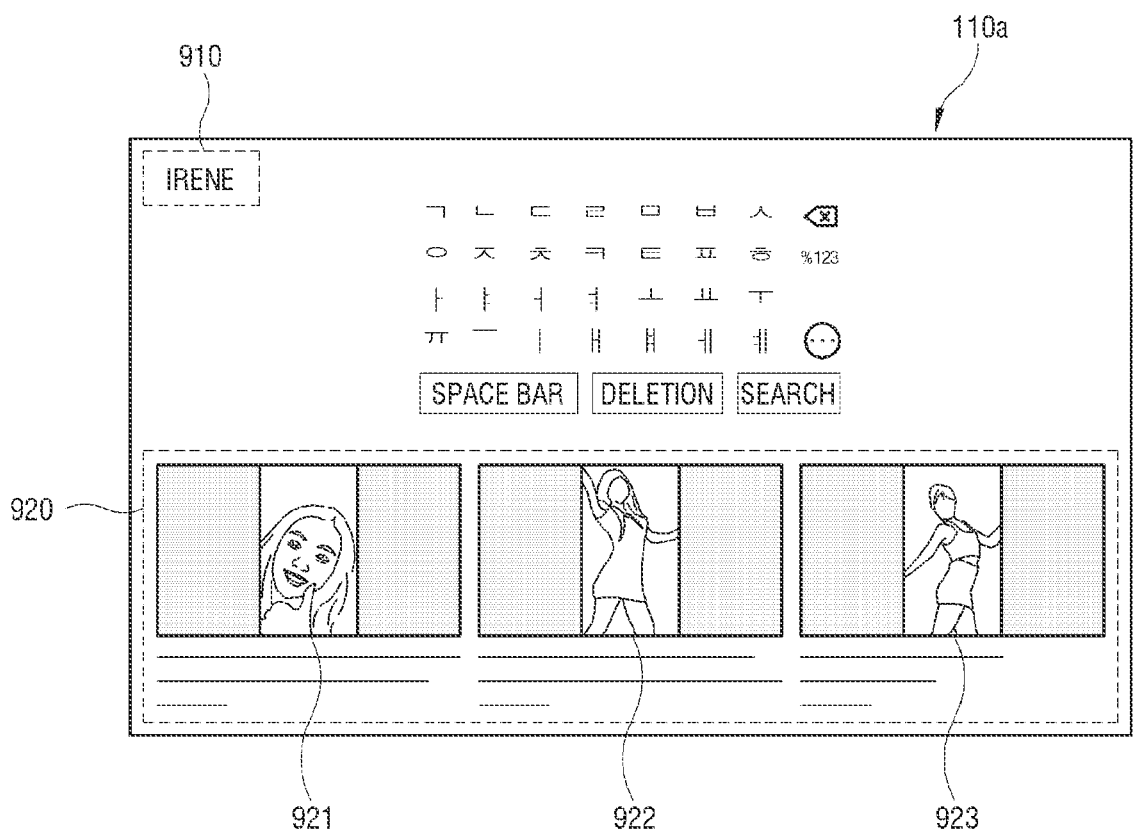
FIG. 14 is a diagram illustrating an example of a screen in a related art that does not identify a screen mode.
Figure 15:
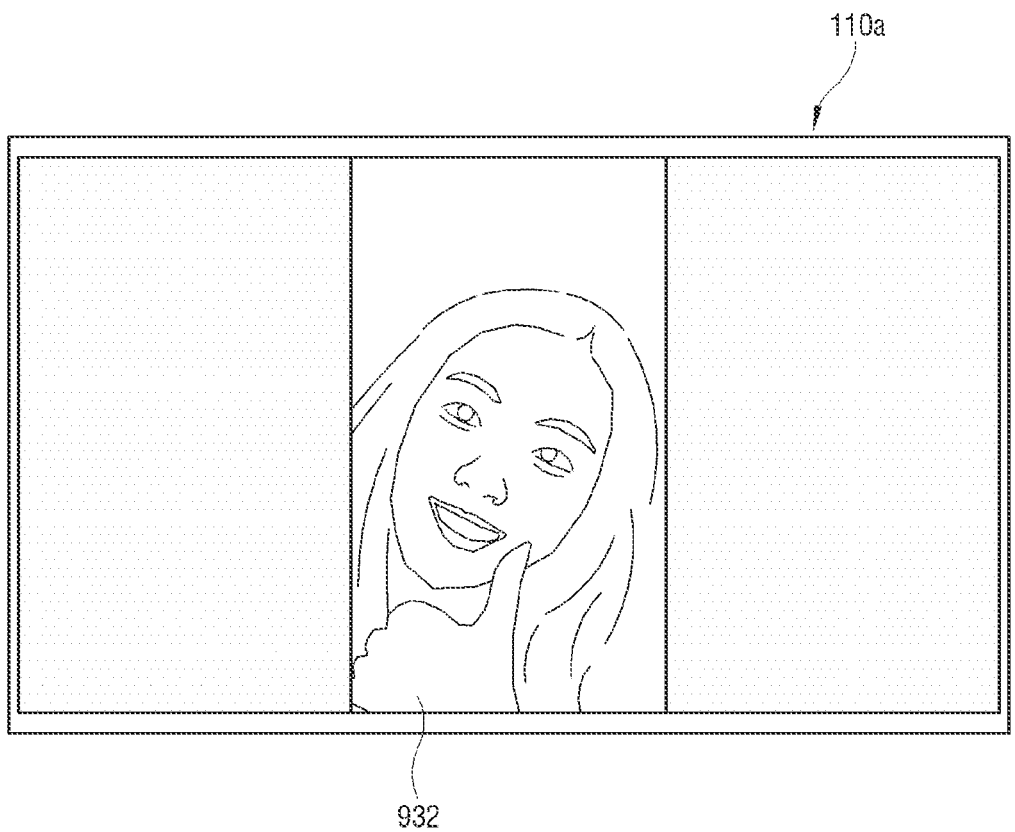
FIG. 15 is a diagram illustrating an example of the screen on which the content selected in FIG. 14 is displayed.

FIG. 14 is a diagram illustrating an example of a screen in a related art that does not identify a screen mode, and FIG. 15 is a diagram illustrating an example of the screen on which the content selected in FIG. 14 is displayed.

In the case of the related technique, as illustrated in FIG. 14, in the state in which a display 110a is in the first mode (landscape mode), a content list 920 including content items 921, 922, and 923 in the portrait mode may be displayed as the search result corresponding to a search word 910. In addition, when any one item 921, that is, a thumbnail image, is selected from the content list 920, the image 831 of the content corresponding to the selected item 921 may be displayed on the display 110a.

Accordingly, as illustrated in FIG. 15, although the display 110a is in the first mode (landscape mode), the content corresponding to the second mode (portrait mode) is displayed on the display 110a, so it may cause inconvenience to a user in viewing content.

Figure 16:
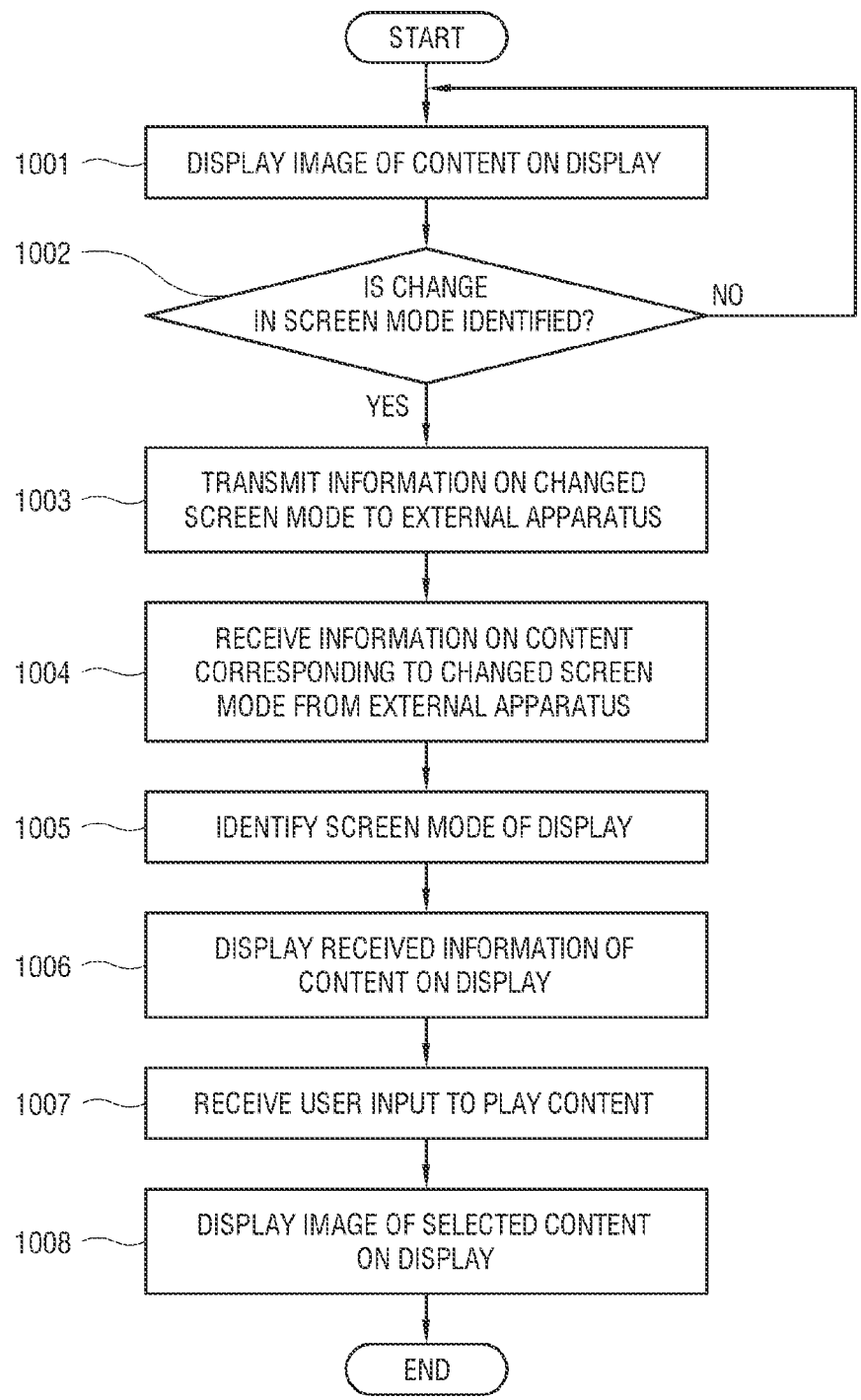
FIG. 16 is a flowchart illustrating an example method of controlling an electronic apparatus according to various embodiments.

FIG. 16 is a flowchart illustrating an example method of controlling an electronic apparatus according to various embodiments.

As illustrated in FIG. 16, the electronic apparatus 1 may display an image of content on the display 110 (1001).

Here, the displayed image of the content may be one received from the server 2 through the interface circuitry 120, and includes, as, for example, an image included in the content list received according to the search request in the embodiment of FIG. 9 and the image of the content displayed in operation 507, a case of content being played according to the continuous playback option.

In an embodiment, operation 1001 may include a case in which the information on the content corresponding to the search result is being displayed in operation 505 of the embodiment of FIG. 9.

The processor 170 may identify the change in the screen mode of the display 110 during the image display in operation 1001 (1002).

In an embodiment, the processor 170 may identify the change in the screen mode in response to receiving the user input for changing the screen mode of the display 110.

In an embodiment, the processor 170 may acquire the information on the rotation state of the display 110 from the sensor 160 to identify the change in the screen mode.

The processor 170 may transmit information on the changed screen mode to an external apparatus, for example, the server 2 through the interface circuitry 120 based on the identification result in operation 1002 (1003).

Here, the information on the screen mode transmitted to the server 2 may be implemented as various kinds or types of data, and for example, the information on the screen mode may be transmitted to the server 2 by assigning a predetermined value (1 or 0) to a predetermined bit of data transmitted in order to indicate the screen mode of the display 110. The server 2 may read bits, to which the value of the screen mode is assigned, from the received data to identify the changed screen mode of the display 110 of the electronic apparatus 1. Accordingly, the server 2 may provide the information on the content corresponding to the changed screen mode to the electronic apparatus 1.

The processor 170 may receive, as a response to the information transmitted in operation 1003, the information on the content corresponding to the identified screen mode from the external apparatus, that is, the server 2 through the interface circuitry 120 (1004).

Here, the information on the received content is related to the predetermined search word as in operation 501 of the embodiment of FIG. 9, and may include the information on the plurality of pieces of content corresponding to the information on the changed screen mode transmitted in operation 1003.

The processor 170 may identify the screen mode of the display (1005) and display the information on the content received in operation 1004 on the display 110 (1006). That is, the processor 170 may control the display 110 to display a plurality of pieces of content items corresponding to the information of the changed screen mode transmitted in operation 1003, for example, the content list including the thumbnail image, based on the information on the content received in operation 1004.

The processor 170 may receive a user input for selecting any one content to be played for the content information displayed in operation 1006 (1007).

The processor 170 may display the image of the selected content on the display 110 based on the user input received in operation 1007 (1008).

Accordingly, when the change in the screen mode of the display 110 is detected while the user is viewing the content, the information or image of the content corresponding to the changed screen mode may be displayed.

FIG. 16 illustrates an embodiment in which when the electronic apparatus 1 detects the change in the screen mode, the information on the content corresponding to the changed screen mode is received and displayed to a user, and an image of a specific content is displayed according to the user selection, but the disclosure is not limited to the embodiment of FIG. 16. For example, in some cases, when the change in the screen mode is detected, the electronic apparatus 1 may be implemented in such a manner that the image of the content corresponding to the changed screen mode is immediately displayed on the display 110.

In addition, as an embodiment, the electronic apparatus 1 may receive the user input that requests to display the search result again while displaying any one image or other images of the plurality of pieces of content of the search result or the information on the content of the search result, as in operation 1001. In this case, the processor 170 may identify whether or not the display 110 rotates after the previous search result is displayed, and provide new information on content corresponding to the identification result, for example, the content list including the plurality of pieces of content corresponding to the rotating screen mode through the display 110.

FIG. 17 is a flowchart illustrating an example method of controlling an electronic apparatus according to various embodiments.

As illustrated in FIG. 17, the electronic apparatus 1 may receive a search request for content from a user (1101).

Here, as described in operation 501 of FIG. 9, the processor 170 executes a predetermined application for content playback, for example, a VOD application, and it is possible to receive a search request for content related to the corresponding search word based on an input of a predetermined keyword as a keyword from a user.

The processor 170 may request a search from an external apparatus, for example, the server 2 based on the search request received in operation 1101 (1102).

The processor 170 may receive, as a response to the search request transmitted in operation 1102, the information on the content corresponding to the search result from the external apparatus, that is, the server 2 (1103).

Here, the information on the received content may include information on a plurality of pieces of content related to the search word input in operation 1101, that is, a content list or a recommendation list including the plurality of pieces of content. Here, the plurality of pieces of contents in the content list may include first content that corresponds to a first mode and has an image with a width longer than a length and second content that corresponds to a second mode and has the length longer than the width.

The processor 170 may identify the screen mode of the display 110 (1104). For example, the processor 170 may identify whether the current screen mode of the display 110 is the first mode, that is, the landscape mode or the second mode, that is, the portrait mode.

In an embodiment, the processor 170 may identify the screen mode based on information on resolution of the display 110. For example, the processor 170 may read the EDID from the storage 140 to acquire information on the screen mode.

In an embodiment, the processor 170 may acquire information on a rotation state of the display 110 from the sensor 160 to identify the screen mode.

In the example embodiment illustrated in FIG. 17, it is illustrated that the identification of the screen mode is performed after requesting a search from the external apparatus and receiving the search result, but the disclosure is not limited thereto. For example, in the electronic apparatus 1 according to the disclosure embodiment, the identification operation of the screen mode of operation 1104 may be performed regardless of operations 1101 to 1103 or may be performed in parallel.

The processor 170 may display the information on the content received in operation 1103 on the display 110 based on the screen mode identified in operation 1104 (1105).

In an embodiment, the processor 170 may select the information on the received content, that is, the content matching the screen mode identified in operation 1104 from the plurality of pieces of content of the content list, and control the display 110 to display the information on the selected content, for example, the content list including the thumbnail image.

In an embodiment, the processor 170 may assign a priority to a level corresponding to the screen mode identified in operation 1104 to the information on the received content, that is, the plurality of pieces of contents of the content list, and provide the information on the plurality of pieces of content as the search result, for example, the content list including the thumbnail image.

For example, when the display 110 is in the first mode (landscape mode), the content (first content) corresponding to the first mode among the plurality of pieces of contents of the content list is given a high priority, and the information on the searched content with a high priority may be mainly displayed on the display 110.

As another example, the processor 170 may assign a higher priority to content that may be displayed with the highest image quality in the resolution of the display 110 among the plurality of pieces of content corresponding to the first mode, and may display the information on the searched content on the display 110 in the order of content assigned a higher priority.

The processor 170 may receive a user input for selecting any one content to be played for the content information displayed in operation 1105 (1106).

The processor 170 may receive, for example, the user input for selecting any one of the content items of the content list, that is, the thumbnail images.

The processor 170 may display the image of the selected content on the display 110 based on the user input received in operation 1106 (1107).

Accordingly, as illustrated in FIG. 13, the content corresponding to the current screen mode of the display 110, that is, the second mode may be displayed on the full screen.

As described above, in the electronic apparatus 1 according to an embodiment of the disclosure, the content corresponding to the screen mode identified by the electronic apparatus 1 among the plurality of pieces of searched content may be selectively displayed, so it is possible to provide more convenience to a user in viewing content compared to when the screen mode is not identified.

Figure 18:
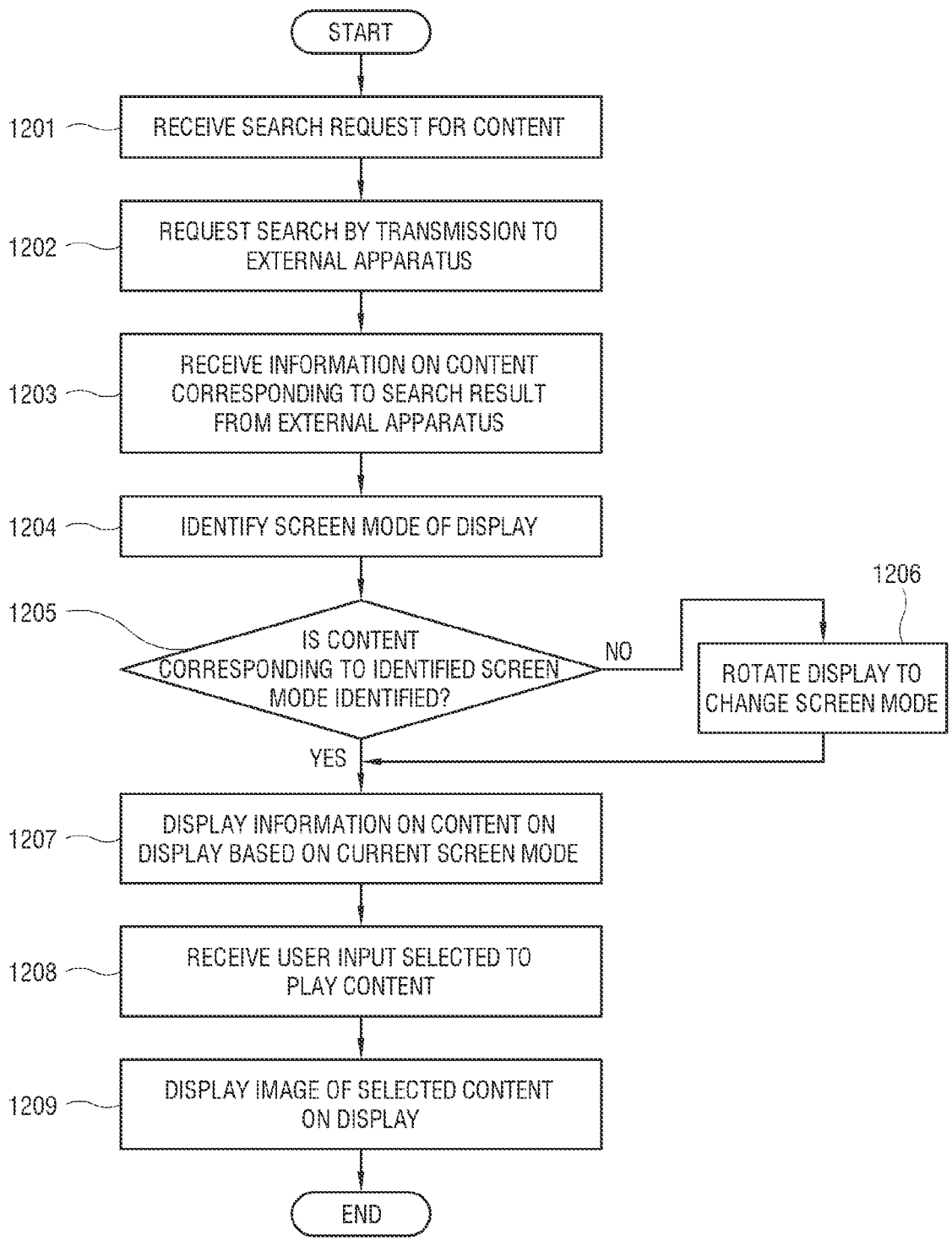
FIG. 18 is a flowchart illustrating an example method of controlling an electronic apparatus according to various embodiments.

FIG. 18 is a flowchart illustrating an example method of controlling an electronic apparatus according to various embodiments.

As illustrated in FIG. 18, the electronic apparatus 1 may receive a search request for content from a user (1201).

Here, as described in operation 501 of FIG. 9, the processor 170 executes a predetermined application for content playback, for example, a VOD application, and it is possible to receive a search request for content related to the corresponding search word based on an input of a predetermined keyword as a keyword from a user.

The processor 170 may request a search from an external apparatus, for example, the server 2 based on the search request received in operation 1201 (1202).

The processor 170 may receive, as a response to the search request transmitted in operation 1202, the information on the content corresponding to the search result from the external apparatus, that is, the server 2 (1203).

Here, the information on the received content may include the information on the plurality of pieces of contents related to the search word input in operation 1201.

The processor 170 may identify the screen mode of the display 110 (1204). For example, the processor 170 may identify whether the current screen mode of the display 110 is the first mode, that is, the landscape mode or the second mode, that is, the portrait mode.

In an embodiment, the processor 170 may identify the screen mode based on information on resolution of the display 110. For example, the processor 170 may read the EDID from the storage 140 to acquire information on the screen mode.

In an embodiment, the processor 170 may acquire information on a rotation state of the display 110 from the sensor 160 to identify the screen mode.

In the embodiment illustrated in FIG. 18, it is illustrated that the identification of the screen mode is performed after requesting a search from the external apparatus and receiving the search result, but the disclosure is not limited thereto. For example, in the electronic apparatus 1 according to the disclosure embodiment, the identification operation of the screen mode of operation 1204 may be performed regardless of operations 1201 to 1203 or may be performed in parallel.

The processor 170 may identify whether the information of content received in operation 1103, that is, the content corresponding to the screen mode of the display 110 identified in operation 1204, for the plurality of pieces of contents corresponding to the search result (1205).

The processor 170 may rotate the display 110 to change the screen mode based on the identification in operation 1205 (1206).

For example, in operation 1205, when the content corresponding to the screen mode identified in operation 1204 is not identified in the plurality of pieces of searched content, the processor 170 may control the driver 150 to rotate the display 110 in order to change the screen mode.

For example, in the state in which the display 110 is identified as the first mode in operation 1204, if it is identified that there is no content corresponding to the identified first mode among the plurality of pieces of searched content, the processor 170 may control the driver 150 to rotate the display 110 in the second mode.

The processor 170 may display the information on the content on the display 110 based on the current screen mode of the display 110, for example, the screen mode (second mode) changed according to the rotation in operation 1206 (1207).

In operation 1205, when the content corresponding to the screen mode identified in operation 1204 is identified from the plurality of pieces of searched content, the processor 170 may display the information on the content received in operation 1203 on the display 110 based on the current screen mode, that is, the identified screen mode (1207). For example, in the state in which the display 110 is identified as the first mode in operation 1204, the content corresponding to the identified first mode among a plurality of pieces of searched content may be preferentially displayed on the display 110.

In an embodiment, the processor 170 may select the information on the received content, that is, the content matching the current screen mode from the plurality of pieces of content of the content list, and control the display 110 to display the information on the selected content, for example, the content list including the thumbnail image.

In an embodiment, the processor 170 may assign a priority to a level corresponding to the current screen mode to the information on the received content, that is, the plurality of pieces of contents of the content list, and provide the information on the plurality of pieces of content as the search result according to the priority, for example, the content list including the thumbnail image.

The processor 170 may receive a user input for selecting any one content to be played for the content information displayed in operation 1207 (1208).

The processor 170 may receive, for example, the user input for selecting any one of the content items of the content list, that is, the thumbnail images.

The processor 170 may display the image of the selected content on the display 110 based on the user input received in operation 1208 (1209).

Accordingly, as illustrated in FIG. 13, the content corresponding to the current screen mode of the display 110, that is, the second mode may be displayed on the full screen.

As described above, in the electronic apparatus 1 according to an embodiment of the disclosure, when there is no content corresponding to the screen mode identified by the electronic apparatus 1 among the plurality of pieces of searched content, the display 110 rotates to display the image of the content corresponding to the screen mode, so it is possible to provide more convenience to a user in viewing the content.

According to an embodiment, the methods according to various embodiments disclosed in the document may be included in a computer program product and provided. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smart phones) online. In a case of the online distribution, at least some of the computer program products (for example, downloadable app) may be at least temporarily stored in a machine-readable storage medium such as a memory of a server of a manufacturer, a server of an application store, or a relay server or be temporarily created.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic apparatus, comprising:
a main body;
a display;
a driver configured to rotate the display relative to the main body; and
at least one processor comprising processing circuitry, the at least one processor, individually and/or collectively, configured to:
control the driver to rotate the display in a first mode to a second mode, one of the first mode and the second mode corresponding to a landscape orientation and the other of the first and second mode corresponding to a portrait orientation,
receive an input associated with a keyword,
receive, from an external device, information on a plurality of content related to a search operation performed using at least the keyword, the received plurality of content including first content that corresponds to the first mode and second content that corresponds to the second mode,
provide a list including at least one content corresponding to the second mode, and
based on the driver rotating the display in the second mode to the first mode, update the list to include at least a portion of the first content and at least a portion of the second content, wherein the plurality of content included in the list are ordered based on a priority assigned to the plurality of content with the content corresponding to the first mode having a higher priority.

2. The electronic apparatus of claim 1, wherein the processor is configured to control to transmit information on the second mode of the display to an external apparatus for the search operation.

3. The electronic apparatus of claim 1, wherein the at least one processor, individually and/or collectively, is configured to control the display to display content corresponding to the second mode based on the first content in the list being selected according to a user input.

4. The electronic apparatus of claim 3, wherein the at least one processor, individually and/or collectively, is configured to control the display to continuously display at least one content corresponding to the second mode based on the first content in the list being selected according to a user input.

5. The electronic apparatus of claim 1, wherein the at least one processor, individually and/or collectively, is configured to control the driver to rotate the display based on an event occurring.

6. The electronic apparatus of claim 5, wherein providing the list including the at least one content corresponding to the second mode includes providing at least a portion of the first content and at least a portion of the second content based on a priority assigned to the plurality of content with the content corresponding to the second mode having a higher priority.

7. The electronic apparatus of claim 1, wherein the at least one processor, individually and/or collectively, is configured to provide the list based on a priority assigned to the plurality of content with the content including the highest image quality having a higher priority.

8. A method of controlling an electronic apparatus comprising a main body, a display, and a driver configured to rotate the display relative to the main body, the method comprising:
controlling the driver to rotate the display in a first mode to a second mode, one of the first mode and the second mode corresponding to a landscape orientation and the other of the first and second mode corresponding to a portrait orientation;
receiving an input associated with a keyword;
receiving, from an external device, information on a plurality of content related to a search operation performed using at least the keyword, the received plurality of content including first content that corresponds to the first mode and second content that corresponds to the second mode;
providing a list including at least one content corresponding to the second mode; and
based on the driver rotating the display in the second mode to the first mode, updating the list to include at least a portion of the first content and at least a portion of the second content, wherein the plurality of content included in the list are ordered based on a priority assigned to the plurality of content with the content corresponding to the first mode having a higher priority.

9. The method of claim 8, further comprising transmitting information on the second mode of the display to an external apparatus for the search operation.

10. The method of claim 8, further comprising displaying content corresponding to the second mode based on the first content in the list being selected according to a user input.

11. The method of claim 10, further comprising continuously displaying at least one content corresponding to the second mode based on the first content in the list selected according to a user input.

12. The method of claim 8, further comprising controlling the driver to rotate the display based on an event occurring.

13. The method of claim 12, wherein providing the list including the at least one content corresponding to the second mode includes providing at least a portion of the first content and at least a portion of the second content based on a priority assigned to the plurality of content with the content corresponding to the second mode having a higher priority.

14. The method of claim 8, wherein the providing the list comprises providing the list based on a priority assigned to the plurality of content with the content including the highest image quality having a higher priority.

15. A non-transitory computer-readable recording medium having recorded thereon a program executable by at least one processor of an electronic apparatus to perform a method, electronic apparatus comprising a main body, a display, and a driver configured to rotate the display relative to the main body, the method comprising:
controlling the driver to rotate the display in a first mode to a second mode, one of the first mode and the second mode corresponding to a landscape orientation and the other of the first and second mode corresponding to a portrait orientation;
receiving an input associated with a keyword;
receiving, from an external device, information on a plurality of content related to a search operation performed using at least the keyword, the received plurality of content including first content that corresponds to the first mode and second content that corresponds to the second mode;
providing a list including at least one content corresponding to the second mode; and
based on the driver rotating the display in the second mode to the first mode, updating the list to include at least a portion of the first content and at least a portion of the second content, wherein the plurality of content included in the list are ordered based on a priority assigned to the plurality of content with the content corresponding to the first mode having a higher priority.

\* \* \* \* \*